(12) United States Patent  (10) Patent No.: US 11,194,156 B2
Kawana  (45) Date of Patent: Dec. 7, 2021

(54) HEAD-UP DISPLAY DEVICE

(71) Applicant: FUJIFILM Corporation, Tokyo (JP)

(72) Inventor: Masanao Kawana, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 16/872,122

(22) Filed: May 11, 2020

(65) Prior Publication Data

US 2020/0271927 A1 Aug. 27, 2020

Related U.S. Application Data

(63) Continuation of application No. PCT/JP2018/043535, filed on Nov. 27, 2018.

(30) Foreign Application Priority Data

Dec. 25, 2017 (JP) .............................. JP2017-248468

(51) Int. Cl.
*G02B 27/01* (2006.01)
*B60K 37/02* (2006.01)
(Continued)

(52) U.S. Cl.
CPC .......... *G02B 27/0101* (2013.01); *B60K 37/02* (2013.01); *G02B 5/0816* (2013.01);
(Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS 4,892,386 A * 1/1990 Suzuki ............... G02B 27/0101
359/630
5,734,506 A * 3/1998 Williams ........... G02B 27/0101
359/630
(Continued)

FOREIGN PATENT DOCUMENTS

DE 10157605 C1 6/2003
JP 2009-115908 A 5/2009
(Continued)

OTHER PUBLICATIONS

International Search Report issued in PCT/JP2018/043535; dated Feb. 12, 2019.
(Continued)

*Primary Examiner* — William R Alexander
*Assistant Examiner* — Sharrief I Broome
(74) *Attorney, Agent, or Firm* — Studebaker & Brackett PC

(57) ABSTRACT

There is provided a head-up display device which has a small size and of which the aberration is small and the range of an eye box in a vertical direction is wide. The head-up display device 10 includes a first optical system that includes at least one concave mirror arranged along an optical path of display light in order from an image display surface 1, and a second optical system that includes at least one concave mirror arranged along the optical path of the display light in order from the image display surface 1 side. An intermediate image is formed between the first and second optical systems on the optical path, and the first optical system includes a double reflection mirror that reflects the display light twice on the optical path.

20 Claims, 10 Drawing Sheets

(51) Int. Cl.
*G02B 5/08* (2006.01)
*G02B 5/10* (2006.01)

(52) U.S. Cl.
CPC ........ *G02B 5/10* (2013.01); *B60K 2370/1529* (2019.05); *B60K 2370/23* (2019.05); *B60K 2370/334* (2019.05); *G02B 2027/0145* (2013.01)

(58) Field of Classification Search
CPC .... G02B 2027/0118; G02B 2027/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06T 19/006; G06T 2207/10028; G06T 2219/016; G06T 7/529; G06T 19/20; G06T 3/20; G06T 5/00; G06T 5/006; G06F 3/013; G06F 3/017; G06F 1/163; G06F 3/011; G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/334; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/23; B60K 2370/25; B60K 2370/52; G06K 9/00671; G06K 9/00604; G06K 9/00691; G06K 9/00704; G06K 9/2063; G06K 9/2081; G06K 9/209; G06K 9/00597; G06K 9/00805; G02C 11/10; G02C 2200/06; G02C 2200/08; G02C 5/126; G02C 5/20; G02C 7/16; G02C 1/10; G02C 2200/18; G02C 2202/20; G02C 3/02; G02C 5/124; G02C 5/143; G02C 5/146; G02C 5/16; G02C 7/04; G02C 7/086; G02C 7/101; G02C 7/102; G02C 7/12; G02C 9/04; B32B 2037/1253; B32B 2307/416; B32B 2307/42; B32B 2551/00; B32B 2551/08; B32B 37/1284; B32B 37/24; B32B 38/0008; B32B 17/061; B60R 1/00; B60R 2300/205; B60R 11/0235; B60R 11/0229; B60R 2011/0094; B60R 1/12; B60R 2001/1253; B60R 2011/0005; B60R 2011/0026; B60R 2011/0035; B60R 2011/0059; B60R 2011/008; H04N 13/344; H04N 5/332; H04N 5/33; H04N 5/64; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; H04N 9/3161; G09G 3/3208; G09G 2310/0235; G09G 2320/0626; G09G 2340/0471; G09G 2340/0478; G09G 2360/144; G09G 3/2003; G09G 3/3225; G09G 3/3233; G09G 3/36; G09G 2300/0478; G09G 2310/08; G09G 2320/0252; G09G 2320/041; G09G 2320/10; G09G 2340/0407; G09G 3/001; G09G 3/002; G09G 3/18; G09G 3/32

See application file for complete search history.

(56) References Cited

U.S. PATENT DOCUMENTS

| | | | |
|---|---|---|---|
| 2015/0260987 A1* | 9/2015 | Weingarten | G02B 27/0101 348/115 |
| 2015/0277115 A1* | 10/2015 | Inamoto | G02B 3/0056 359/619 |
| 2017/0212346 A1* | 7/2017 | Kawana | G02B 27/0101 |
| 2018/0129042 A1* | 5/2018 | Yamazoe | G02B 13/16 |
| 2019/0033590 A1* | 1/2019 | Kasahara | G06F 3/147 |

FOREIGN PATENT DOCUMENTS

| | | |
|---|---|---|
| JP | 2014-170112 A | 9/2014 |
| JP | 2016-186509 A | 10/2016 |
| JP | 6096911 B2 | 3/2017 |
| JP | 2017-120388 A | 7/2017 |
| JP | 2017-134141 A | 8/2017 |
| WO | 2017130763 A1 | 8/2017 |

OTHER PUBLICATIONS

International Preliminary Report on Patentability and Written Opinion issued in PCT/JP2018/043535; dated Jun. 30, 2020.

* cited by examiner

REFERENCE EXAMPLE 2

EXAMPLE 1

EXAMPLE 2

EXAMPLE 4

EXAMPLE 6

HEAD-UP DISPLAY DEVICE

CROSS-REFERENCE TO RELATED APPLICATIONS

This application is a Continuation of PCT International Application No. PCT/JP2018/043535 filed on Nov. 27, 2018, which claims priority under 35 U.S.C. § 119(a) to Japanese Patent Application No. 2017-248468 filed on Dec. 25, 2017. Each of the above application(s) is hereby expressly incorporated by reference, in its entirety, into the present application.

BACKGROUND OF THE INVENTION

1. Field of the Invention

The present invention relates to a head-up display device that reflects display light of an image, which is displayed on an image display surface, toward an observer by an image-reflecting surface facing the observer to enlarge and display the image to the observer as a virtual image beyond the image-reflecting surface.

2. Description of the Related Art

In the past, a head-up display device has been known as a device that displays information, such as the indication of a direction, calling for attention, and a travel speed, to a driver of an automobile or the like. The head-up display device is to project the virtual image of an image, which is to be displayed, to an image-reflecting surface, such as a windshield or a combiner, so that a driver can recognize information required to drive an automobile or the like without taking his eyes off the field of view. Devices disclosed in JP6096911B, JP2014-170112A, JP2016-186509A, and JP2017-120388A are proposed as such a head-up display device.

SUMMARY OF THE INVENTION

Since the head-up display device needs to be installed in a limited space around a driver's seat of a moving body, such as an automobile, the head-up display device is required to be small. Further, since the number of pixels of an image display element to be mounted on the head-up display device has increased in recent years, a high-performance optical system of which the aberration is corrected well has been required as even an optical system that is used to display a virtual image according to an increase in the number of pixels.

In addition, a method, which is called augmented reality (AR) for displaying information about navigation and/or information about facilities so as to correspond to the scenery seen beyond a windshield, has been proposed in head-up display devices in recent years. In a case where AR contents are to be displayed, information is not effective as long as the information is not displayed so as to exactly correspond to each of the positions of the facilities and/or the roads in the scenery that is seen beyond the windshield. Accordingly, the display position and angle of a virtual image need to be exactly set in consideration of the position of the driver's eyes.

Incidentally, a range in which a driver can appropriately observe a virtual image, that is, an eye box is determined in a head-up display device. The eye box is set in a range in which the driver's eyes are assumed to be positioned in a case where a driver takes an appropriate driving posture. Since the position of the driver's seat in a lateral direction is generally fixed, the driver's eyes are unlikely to deviate from the eye box in the lateral direction. However, since the position of the driver's seat is generally adjustable in a front-rear direction and a vertical direction and the driver's height and the driver's driving posture vary, the driver's eyes are likely to deviate from the eye box in the vertical direction. For this reason, the eye box itself is required to be enlarged in the vertical direction and a virtual image is required to be appropriately displayed to various drivers.

In a case where a head-up display device of which the aberration is small and the range of an eye box in the vertical direction is wide is to be formed, a method of increasing the magnification of the display size of a virtual image to the size of an image display element by increasing the length of an optical path up to an image-reflecting surface from the image display element is considered to ensure an eye box that has a sufficient size even in the case of a concave mirror having small curvature while suppressing the occurrence of aberration by reducing the curvature of a concave mirror for projecting display light.

The ensuring of the length of an optical path is inconsistent with a demand for a reduction of the size of the device. However, for the compatibility of the ensuring of the length of an optical path and a reduction in the size of the device, a plurality of mirrors are combined to bend the optical path of display light emitted from an image display element in the devices disclosed in JP6096911B, JP2014-170112A, JP2016-186509A, and JP2017-120388A, so that the length of an optical path is ensured in a predetermined space. However, since it cannot be said that the devices disclosed in JP6096911B, JP2014-170112A, JP2016-186509A, and JP2017-120388A are sufficiently reduced in size in response to recent demands for a reduction in size, there are demands for a further reduction in size.

The invention has been made in consideration of the above-mentioned circumstances, and an object of the invention is to provide a head-up display device which has a small size and of which the aberration is small and the range of an eye box in a vertical direction is wide.

A head-up display device according to an aspect of the invention reflects display light of an image, which is displayed on an image display surface, toward an observer side by an image-reflecting surface facing the observer to enlarge and display the image to the observer as a virtual image beyond the image-reflecting surface. The head-up display device comprises a first optical system that includes at least one concave mirror, and a second optical system that includes at least one concave mirror, arranged along an optical path of the display light in order from the image display surface side. An intermediate image is formed between the first and second optical systems on the optical path, and the first optical system includes a double reflection mirror that reflects the display light twice on the optical path.

Here, not only the image display surface of an image display element but also an image display surface of a diffusion member, in a case where an image displayed on the image display element is temporarily projected to the diffusion member, such as a diffuser, to widen the range of the pupil position of an observer in which a virtual image can be appropriately observed (hereinafter, written as an eye box), may also be regarded as the "image display surface".

It is preferable that the head-up display device according to the aspect of the invention further comprises a stop positioned closer to the image display surface side than the second optical system on the optical path.

Further, it is preferable that the first optical system includes only one concave mirror.

Furthermore, it is preferable that the first optical system includes the double reflection mirror of planar shape and a concave mirror arranged on the optical path in order from a side closest to the image display surface side and the display light emitted from the image display surface is reflected by the double reflection mirror, the concave mirror, and the double reflection mirror in order.

Moreover, the second optical system may consist of one concave mirror and consist of one concave mirror and one plane mirror.

A head-up display device according to an aspect of the invention reflects display light of an image, which is displayed on an image display surface, toward an observer side by an image-reflecting surface facing the observer to enlarge and display the image to the observer as a virtual image beyond the image-reflecting surface. The head-up display device comprises a first optical system that includes at least one concave mirror, and a second optical system that includes at least one concave mirror, arranged along an optical path of the display light in order from the image display surface. An intermediate image is formed between the first and second optical systems on the optical path, and the first optical system includes a double reflection mirror that reflects the display light twice on the optical path. Accordingly, a head-up display device which has a small size and of which the aberration is small and the range of an eye box in a vertical direction is wide can be provided.

DESCRIPTION OF THE PREFERRED EMBODIMENTS

Figure 1:
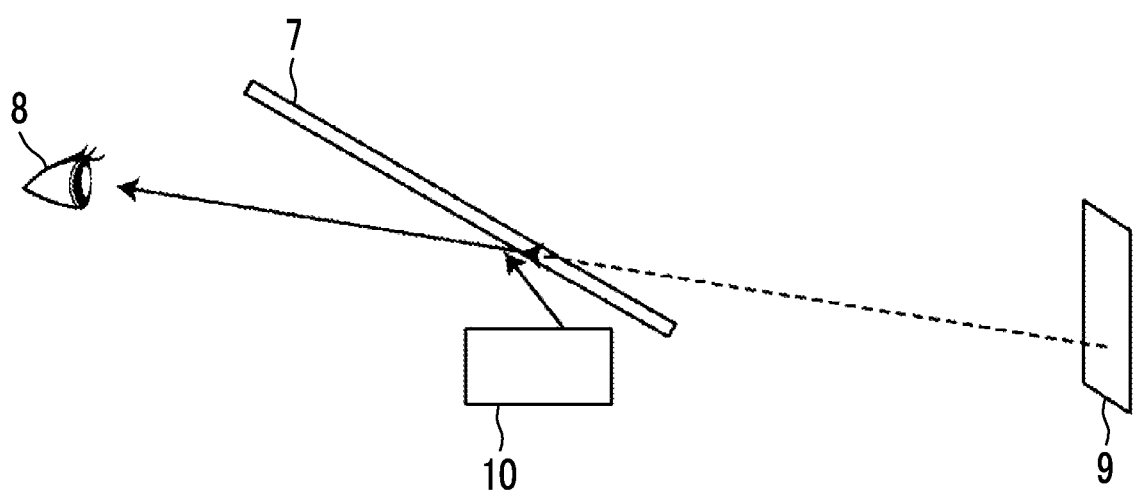
FIG. 1 is a schematic diagram of the driver's seat of an automobile on which a head-up display device according to an embodiment of the invention is mounted.

An embodiment of the invention will be described in detail below with reference to the drawings. FIG. 1 is a schematic diagram of the driver's seat of an automobile on which a head-up display device according to an embodiment of the invention is mounted, and FIG. 2 is a diagram showing the schematic configuration of the head-up display device.

As shown in FIG. 1, a head-up display device 10 according to this embodiment is disposed in the dashboard of an automobile, and reflects an image, which is emitted from the inside of the device and represents information, such as a travel speed, by a windshield (image-reflecting surface) 7 to enlarge and display the image as a virtual image 9 on the front side of a driver (observer) beyond the windshield 7 in a state where the position of the pupil of the driver (observer) is in an eye box 8.

Figure 2:
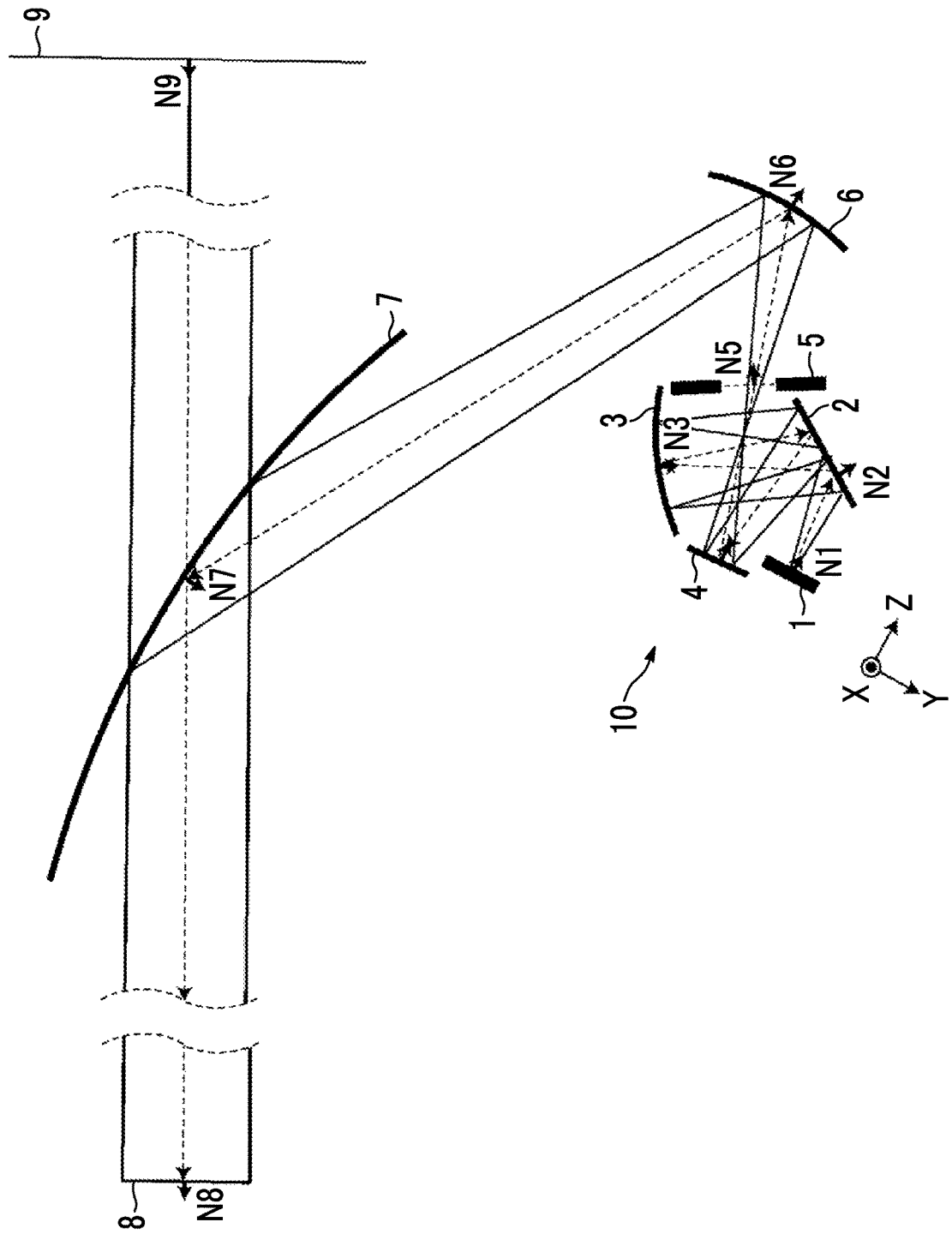
FIG. 2 is a diagram showing the schematic configuration of the head-up display device.

As shown in FIG. 2, the head-up display device 10 includes a first optical system including at least one concave mirror and a second optical system including at least one concave mirror, and is adapted so that an intermediate image is formed between the first and second optical systems on an optical path at a position conjugate to an image display surface 1 through the first optical system.

Specifically, the first optical system is composed of a plane mirror 2, a concave mirror 3, and a plane mirror 4 that are arranged along the optical path of display light in order from the image display surface 1 side. The plane mirror 2 functions as a double reflection mirror that reflects display light twice on the optical path of the display light. The second optical system is composed of only a concave mirror 6.

The image display surface 1 may be adapted so that the image display surface of an image display element, such as a liquid crystal display (LCD) or an organic light emitting diode (OLED), is used as the image display surface 1 of FIG. 2, and a diffusion member, such as a diffuser, may be disposed on the image display surface 1 of FIG. 2 and an image may be projected to the diffusion member by a projector device (not shown).

In the head-up display device 10 according to this embodiment, the display light emitted from the image display surface 1 is reflected by the plane mirror 2 (double reflection mirror), the concave mirror 3, the plane mirror 2 (double reflection mirror), the plane mirror 4, and the concave mirror 6 in order and reaches the windshield (image-reflecting surface) 7.

Since an intermediate image is formed between the first and second optical systems, that is, between the plane mirror 4 and the concave mirror 6 as described above and the display light is converged once in the optical system, the luminous flux of the display light can be made to be narrow. In addition, since the plane mirror 2 (double reflection mirror), which reflects display light twice on the optical path of the display light, is disposed to bend the optical path, the length of the optical path can be ensured while the size of the optical system is reduced as a whole.

Further, since each of the first and second optical systems is made to include at least one concave mirror, power required to enlarge and project the display light can be shared by two mirrors. Accordingly, aberration can be suppressed.

Therefore, the head-up display device 10 according to this embodiment may be a head-up display device which has a small size and of which the aberration is small and the range of an eye box in a vertical direction is wide.

It is preferable that the head-up display device 10 according to this embodiment includes a stop 5 positioned closer to the image display surface 1 side than the second optical system (concave mirror 6) on the optical path. Since the stop 5 is disposed at a position which is present in the vicinity of the intermediate image and at which luminous flux is narrow as described above, stray light can be prevented. Accordingly, the display contrast of the virtual image 9 can be improved.

Further, it is preferable that the first optical system includes only one concave mirror. According to this configuration, the number of concave mirrors more expensive than that of a plane mirror can be reduced to the minimum, which contributes to a reduction in cost.

Furthermore, it is preferable that the first optical system includes the planar double reflection mirror (plane mirror 2) and the concave mirror 3 arranged on the optical path in order from the side closest to the image display surface 1 side and display light emitted from the image display surface 1 is reflected by the plane mirror 2 (double reflection mirror), the concave mirror 3, and the plane mirror 2 (double reflection mirror) in order. Aberration does not occur on a planar mirror regardless of an incidence angle. Accordingly, in a case where, particularly a double reflection mirror is formed in a planar shape, the degree of freedom in the arrangement of the optical systems can be secured without the occurrence of aberration.

Moreover, the second optical system may consist of one concave mirror. According to this configuration, it is advantageous even in reducing the size of the optical system in the vertical direction (a vertical direction in FIG. 2). Examples 1 and 6 to be described later correspond to this aspect.

Further, the second optical system may consist of one concave mirror and one plane mirror. According to this configuration, it is advantageous even in reducing the size of the optical system in a front-rear direction (a lateral direction in FIG. 2). Examples 2 to 5 to be described later correspond to this aspect.

Next, Reference examples and the numerical examples of the head-up display device according to the embodiment of the invention will be described.

Reference Example 1

Figure 3:
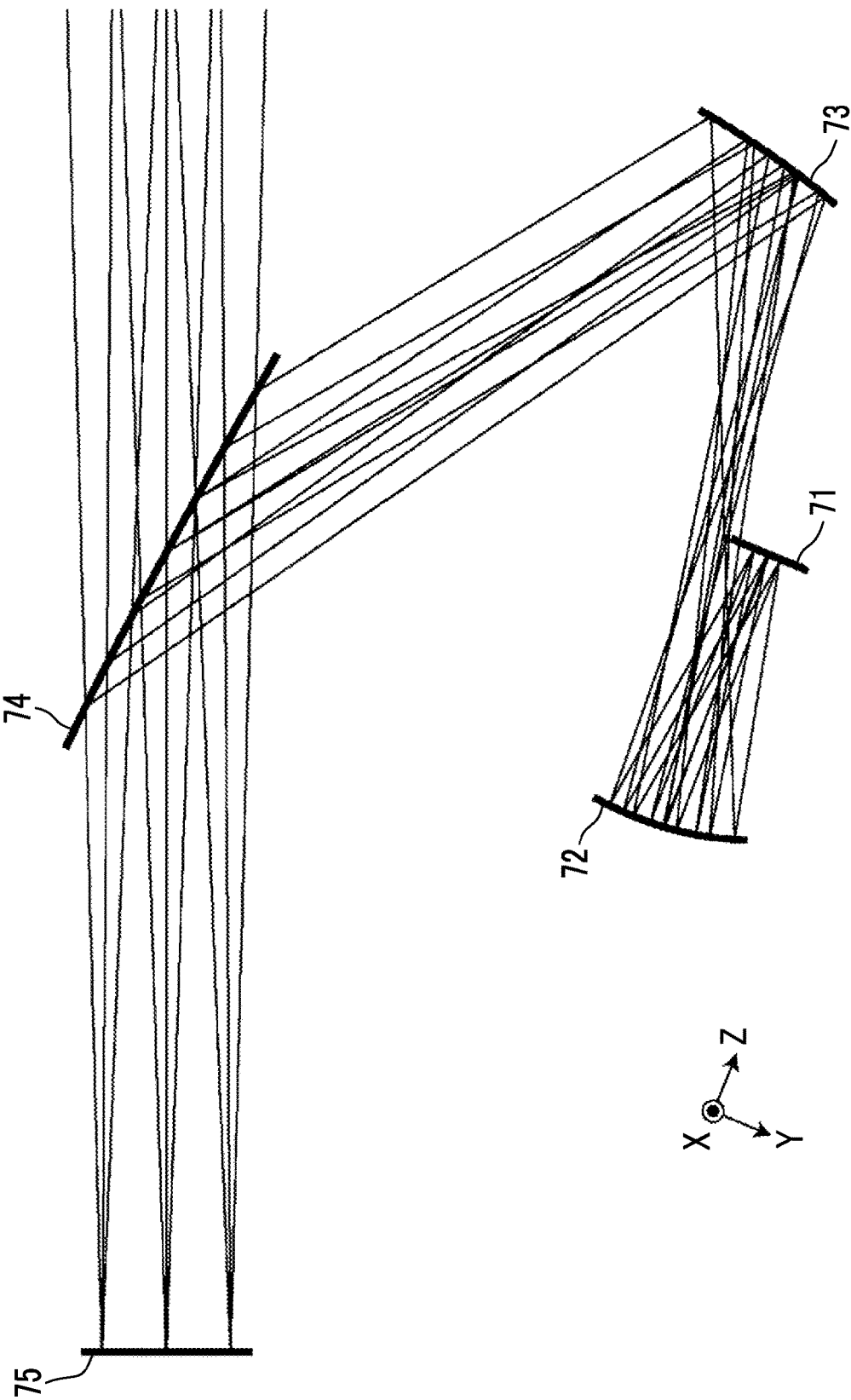
FIG. 3 is a diagram showing the schematic configuration of a head-up display device of Reference example 1.

First, a head-up display device of Reference example 1 will be described. FIG. 3 is a diagram showing the schematic configuration of the head-up display device of Reference example 1.

The head-up display device of Reference example 1 is composed of a concave mirror 72, a concave mirror 73, and a windshield 74 that are arranged along the optical path of display light in order from an image display surface 71 side. Reference numeral 75 in FIG. 3 denotes an eye box.

Table 1 shows data regarding the specifications of the head-up display device of Reference example 1, Table 2 shows the arrangement coordinate data of the respective elements of the head-up display device, and Table 3 shows data regarding the free-form surface coefficients of the respective surfaces. The meanings of symbols shown in Tables will be described below using the symbols of Reference example 1 by way of example, but the same basically applies to Reference example 2 and Examples 1 to 6.

The values of the field of view (FOV) [horizontal direction H×vertical direction V] (°), an eye box (incident pupil) size (horizontal direction (mm: millimeter))×vertical direction (mm: millimeter)), a virtual image distance (mm: millimeter), and an image display region (horizontal direction (mm: millimeter)×vertical direction (mm: millimeter)) are shown in the data regarding the specifications shown in Table 1.

The combinations of an absolute coordinate system of which the origin is positioned at the center of the image display surface 71 shown in FIG. 3, and local coordinate systems that are set on the surfaces of the respective elements are shown in the arrangement coordinate data of the respective elements of the head-up display device shown in Table 2.

In the arrangement coordinate data of the respective elements of head-up display devices of Examples 1 to 6 to be described later, (*) is written in configuration elements corresponding to a double reflection mirror that reflects display light twice on the optical path of display light. Further, (**) is written in configuration elements corresponding to a surface into which a mask for cutting a ray is inserted.

The local coordinate systems will be set as described below. The origin of each local coordinate system and a Z-axis component vector are expressed as (x, y, z) and (i, j, k) in the absolute coordinate system, respectively. Further, a plane (X-Y plane), which passes through the origin of each local coordinate system and is perpendicular to a Z axis, is referred to as a reference plane of each element, and a normal vector to each reference plane coincides with the Z axis of the local coordinate system. Furthermore, an X axis is perpendicular to the display plane of FIG. 3 and the side from the display plane of FIG. 3 to the reader's side is referred to as a positive side. Moreover, a Y axis and the Z axis are parallel to the display plane of FIG. 3. Further, the Y axis is set so as to coincide with the cross product of the Z axis and the X axis. Furthermore, the reference plane of each of two concave mirrors and a windshield (image-reflecting surface) has a paraxial curvature, and the shape of a free-form surface is set thereto as an additional shape. Moreover, a rectangular aperture of which a long side corresponds to the X axis and a short side corresponds to the Y axis is set on the reference plane of an element having an aperture value.

Further, the two concave mirrors and the windshield (image-reflecting surface) are reflective surfaces having power, and data regarding the free-form surface coefficients of the respective surfaces are shown in Table 3. The free-form surface coefficient is the value of a rotationally asymmetric aspheric coefficient C(i,j) of a free-form surface equation expressed as the following equation. A rotationally asymmetric aspheric coefficient, which is not particularly shown in Table 3, is 0.

$$Z = \sum_i \sum_j C(i,j) X^i Y^j \qquad \text{[Equation 1]}$$

Here, X, Y, Z: coordinates of which the origins are the apexes of the surfaces

C(i,j): rotationally asymmetric aspheric surface coefficient (i+j=k, k=1 to 10)

TABLE 1

|  | Reference example 1 |
| --- | --- |
| FOV[H × V] | 10° × 4° |
| Eye box size [mm × mm] | 130 × 150 |
| Virtual image distance [mm] | 10000 |
| Image display region [mm × mm] | 90 × 36 |

TABLE 2

| Reference example 1 | Coordinates of origin | | | Normal vector to reference plane | | | Aperture data | | |
|---|---|---|---|---|---|---|---|---|---|
| | x | y | z | i | j | k | Aperture width X | Aperture width Y | Aperture Y shift |
| Image display surface | 0.00 | 0.00 | 0.00 | 0.0000 | 0.0000 | 1.0000 | | | |
| First concave mirror | 0.00 | 2.50 | −330.00 | 0.0000 | −0.0872 | 0.9962 | 202 | 186 | −5.5 |
| Second concave mirror | 0.00 | −127.74 | 408.61 | 0.0000 | 0.2419 | 0.9703 | 390 | 192 | 38.5 |
| Windshield | 0.00 | −651.05 | −261.20 | 0.0000 | 0.9903 | −0.1392 | 402 | 508 | 3.5 |
| Eye box | 0.00 | −313.90 | −1095.67 | 0.0000 | 0.3746 | −0.9272 | | | |
| Virtual image | 0.00 | −4059.97 | 8176.17 | 0.0000 | 0.3746 | −0.9272 | | | |

TABLE 3

| | | Reference example 1 | | |
|---|---|---|---|---|
| | | First concave mirror | Second concave mirror | Windshield |
| R | | 304.8155 | −2159.9481 | ∞ |
| C(i, j) | | | | |
| 1 | 0 | 0.0000000000E+00 | 0.0000000000E+00 | 0.0000000000E+00 |
| 0 | 1 | 1.3869772387E−02 | 4.5476828386E−03 | 9.5121514901E−03 |
| 2 | 0 | −2.2856377417E−04 | −3.6901373056E−04 | 1.1726714047E−04 |
| 1 | 1 | 0.0000000000E+00 | 0.0000000000E+00 | 0.0000000000E+00 |
| 0 | 2 | 3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | 2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | 8.4592795222E−07 | −4.1131478999E−07 | 5.8352454395E−08 |
| 4 | 0 | −6.0505271069E−10 | −3.8577727005E−10 | 1.8076488220E−10 |
| 3 | 1 | 0.0000000000E+00 | 0.0000000000E+00 | 0.0000000000E+00 |
| 2 | 2 | 2.4268195530E−09 | −9.1283326518E−10 | −8.5663602372E−11 |
| 1 | 3 | 0.0000000000E+00 | 0.0000000000E+00 | 0.0000000000E+00 |
| 0 | 4 | −5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | 1.0004211250E−12 | −9.0156142741E−12 | 1.6953219966E−13 |
| 3 | 2 | 0.0000000000E+00 | 0.0000000000E+00 | 0.0000000000E+00 |
| 2 | 3 | −5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | −2.6250295222E−12 | −1.8970231477E−10 | 4.3631225108E−14 |
| 6 | 0 | −3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | −8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | −2.1379011091E−12 | 2.6656951958E−14 | 3.9230162978E−16 |
| 1 | 5 | 0.0000000000E+00 | 0.0000000000E+00 | 0.0000000000E+00 |
| 0 | 6 | 1.2381023087E−12 | 4.9842077884E−12 | 2.0358629739E−16 |
| 7 | 0 | 0.0000000000E+00 | 0.0000000000E+00 | 0.0000000000E+00 |
| 6 | 1 | −9.4521887356E−16 | 4.3523873670E−16 | −2.9914127753E−18 |
| 5 | 2 | 0.0000000000E+00 | 0.0000000000E+00 | 0.0000000000E+00 |
| 3 | 4 | 1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | 8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | −9.8281510176E−16 | 7.8442999372E−14 | 5.7818036623E−19 |
| 8 | 0 | −1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | 1.5901981672E−16 | −1.2991612077E−18 | −4.0929595963E−20 |
| 5 | 3 | 0.0000000000E+00 | 0.0000000000E+00 | 0.0000000000E+00 |
| 4 | 4 | 9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | 3.9879044384E−18 | −1.5202620743E−16 | −5.1769216490E−21 |
| 1 | 7 | 0.0000000000E+00 | 0.0000000000E+00 | 0.0000000000E+00 |
| 0 | 8 | −3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | 6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | −1.1527432752E−18 | 5.5525079488E−21 | 1.4456081800E−22 |
| 5 | 4 | 0.0000000000E+00 | 0.0000000000E+00 | 0.0000000000E+00 |

TABLE 3-continued

| | | Reference example 1 | | |
|---|---|---|---|---|
| | | First concave mirror | Second concave mirror | Windshield |
| 4 | 5 | 2.9326718944E−19 | 2.9724447109E−19 | 1.2455653871E−23 |
| 3 | 6 | 0.0000000000E+00 | 0.0000000000E+00 | 0.0000000000E+00 |
| 2 | 7 | −6.9251238568E−19 | −1.5830478324E−18 | −6.9948609813E−24 |
| 1 | 8 | 0.0000000000E+00 | 0.0000000000E+00 | 0.0000000000E+00 |
| 0 | 9 | 1.4273361665E−19 | 2.7120450086E−18 | 7.3001740686E−24 |
| 10 | 0 | 4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | −1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | 4.1627084014E−21 | 1.3037488330E−22 | 2.5351779086E−25 |
| 5 | 5 | 0.0000000000E+00 | 0.0000000000E+00 | 0.0000000000E+00 |
| 4 | 6 | −1.6635528854E−20 | 7.1995903578E−22 | 5.3614470963E−26 |
| 3 | 7 | 0.0000000000E+00 | 0.0000000000E+00 | 0.0000000000E+00 |
| 2 | 8 | −2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | 2.0146570252E−20 | −1.2575068082E−20 | 8.2400402372E−26 |

Reference Example 2

Figure 4:
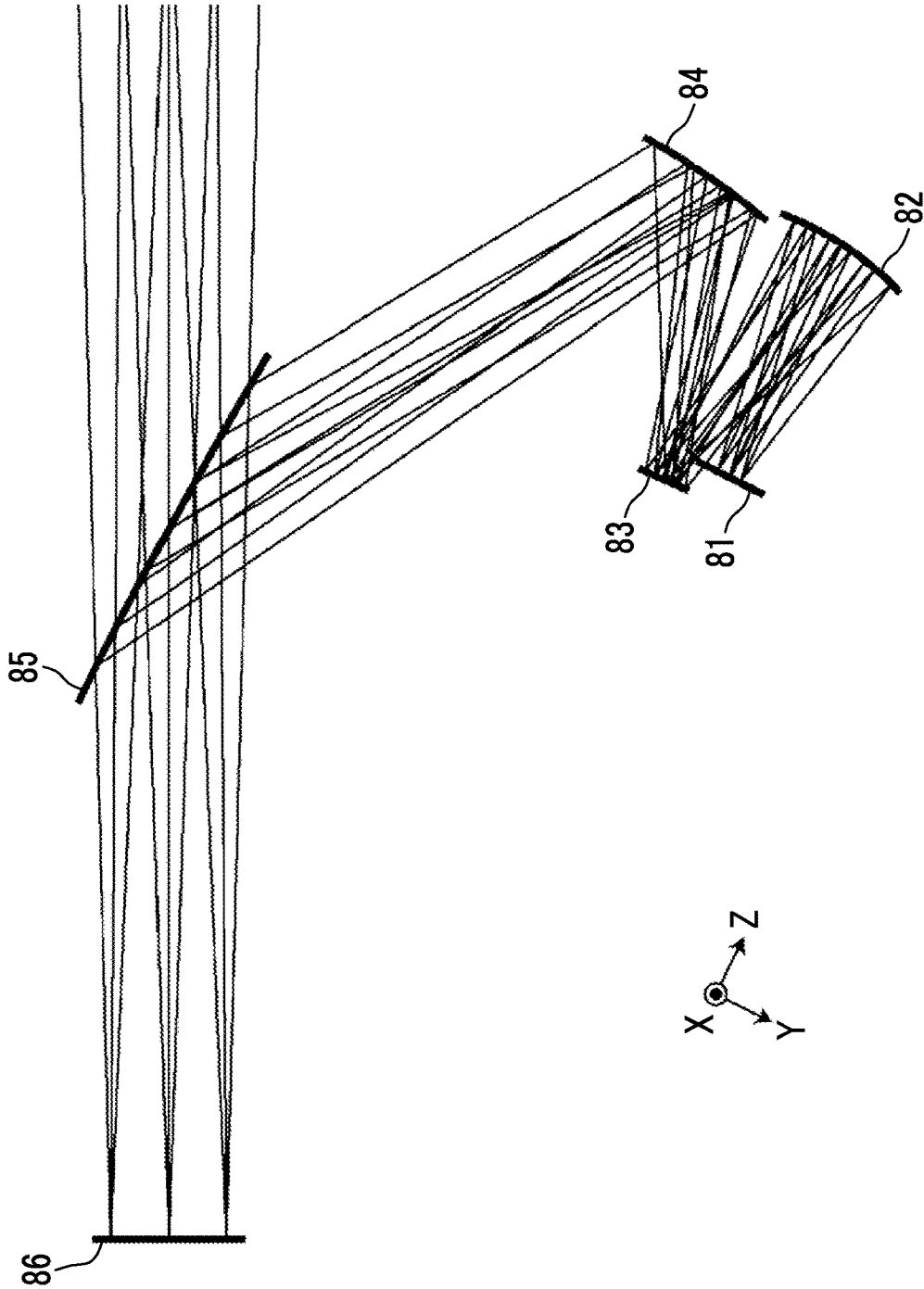
FIG. 4 is a diagram showing the schematic configuration of a head-up display device of Reference example 2.

Next, a head-up display device of Reference example 2 will be described. FIG. 4 is a diagram showing the schematic configuration of the head-up display device of Reference example 2. The head-up display device of Reference example 2 is composed of a concave mirror 82, a plane mirror 83, a concave mirror 84, and a windshield 85 that are arranged along the optical path of display light in order from an image display surface 81 side. Reference numeral 86 in FIG. 4 denotes an eye box. Table 4 shows data regarding the specifications of the head-up display device of Reference example 2, Table 5 shows the arrangement coordinate data of the respective elements of the head-up display device, and Table 6 shows data regarding the free-form surface coefficients of the respective surfaces.

TABLE 4

| | Reference example 2 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 5

| Reference example 2 | Coordinates of origin | | | Normal vector to reference plane | | | Aperture data | | |
|---|---|---|---|---|---|---|---|---|---|
| | x | y | z | i | j | k | Aperture width X | Aperture width Y | Aperture Y shift |
| Image display surface | 0.00 | 0.00 | 0.00 | 0.0000 | 0.0000 | 1.0000 | | | |
| First concave mirror | 0.00 | 2.50 | 330.00 | 0.0000 | 0.0872 | 0.9962 | 202 | 186 | −5.5 |
| Plane mirror | 0.00 | −62.62 | −39.30 | 0.0000 | −0.0349 | 0.9994 | | | |
| Second concave mirror | 0.00 | −153.34 | 324.56 | 0.0000 | 0.1736 | 0.9848 | 390 | 192 | 38.5 |
| Windshield | 0.00 | −628.65 | −380.12 | 0.0000 | 0.9976 | −0.0698 | 402 | 508 | 3.5 |
| Eye box | 0.00 | −234.12 | −1189.04 | 0.0000 | 0.4384 | −0.8988 | | | |
| Virtual image | 0.00 | −4617.83 | 7798.90 | 0.0000 | 0.4384 | −0.8988 | | | |

TABLE 6

| | | Reference example 2 | | |
|---|---|---|---|---|
| | | First concave mirror | Second concave mirror | Windshield |
| R | | −304.8155 | −2159.9481 | ∞ |
| C(i, j) | | | | |
| 1 | 0 | 0.0000000000E+00 | 0.0000000000E+00 | 0.0000000000E+00 |
| 0 | 1 | −1.3869772387E−02 | 4.5476828386E−03 | 9.5121514901E−03 |
| 2 | 0 | 2.2856377417E−04 | −3.6901373056E−04 | 1.1726714047E−04 |
| 1 | 1 | 0.0000000000E+00 | 0.0000000000E+00 | 0.0000000000E+00 |
| 0 | 2 | 3.6913896522E−04 | −2.4288026890E−04 | 6.6451462078E−05 |
| 3 | 0 | 0.0000000000E+00 | 0.0000000000E+00 | 0.0000000000E+00 |

TABLE 6-continued

|  |  | Reference example 2 | | |
|---|---|---|---|---|
|  |  | First concave mirror | Second concave mirror | Windshield |
| 2 | 1 | −2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | −8.4592795222E−07 | −4.1131478999E−07 | 5.8352454395E−08 |
| 4 | 0 | 6.0505271069E−10 | −3.3577727005E−10 | 1.8076488220E−10 |
| 3 | 1 | 0.0000000000E+00 | 0.0000000000E+00 | 0.0000000000E+00 |
| 2 | 2 | −2.4268195530E−09 | −9.1283326518E−10 | −8.5663602372E−11 |
| 1 | 3 | 0.0000000000E+00 | 0.0000000000E+00 | 0.0000000000E+00 |
| 0 | 4 | 5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | −1.0004211250E−12 | −9.0156142741E−12 | 1.6953219966E−13 |
| 3 | 2 | 0.0000000000E+00 | 0.0000000000E+00 | 0.0000000000E+00 |
| 2 | 3 | 5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | 2.6250295222E−12 | −1.8970231477E−10 | 4.3631225108E−14 |
| 6 | 0 | 3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | 8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | 2.1379011091E−12 | 2.6656951958E−14 | 3.9230162978E−16 |
| 1 | 5 | 0.0000000000E+00 | 0.0000000000E+00 | 0.0000000000E+00 |
| 0 | 6 | −1.2381023087E−12 | 4.9842077884E−12 | 2.0358629739E−16 |
| 7 | 0 | 0.0000000000E+00 | 0.0000000000E+00 | 0.0000000000E+00 |
| 6 | 1 | 9.4521887356E−16 | 4.3523873670E−16 | −2.9914127753E−18 |
| 5 | 2 | 0.0000000000E+00 | 0.0000000000E+00 | 0.0000000000E+00 |
| 3 | 4 | −1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | −8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | 9.8281510176E−16 | 7.8442999372E−14 | 5.7818036623E−19 |
| 8 | 0 | 1.6050619873E−17 | 2.8176464650E−19 | 1.4543651606E−19 |
| 7 | 1 | 0.0000000000E+00 | 0.0000000000E+00 | 0.0000000000E+00 |
| 6 | 2 | −1.5901981672E−16 | −1.2991612077E−18 | −4.0929595963E−20 |
| 5 | 3 | 0.0000000000E+00 | 0.0000000000E+00 | 0.0000000000E+00 |
| 4 | 4 | −9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | −3.9879044384E−16 | −1.5202620743E−16 | −5.1769216490E−21 |
| 1 | 7 | 0.0000000000E+00 | 0.0000000000E+00 | 0.0000000000E+00 |
| 0 | 8 | 3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | −6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | 1.1527432752E−18 | 5.5525079488E−21 | 1.4456081800E−22 |
| 5 | 4 | 0.0000000000E+00 | 0.0000000000E+00 | 0.0000000000E+00 |
| 4 | 5 | −2.9326718944E−19 | 2.9724447109E−19 | 1.2455653871E−23 |
| 3 | 6 | 0.0000000000E+00 | 0.0000000000E+00 | 0.0000000000E+00 |
| 2 | 7 | 6.9251238568E−19 | −1.5830478324E−18 | −6.9948609813E−24 |
| 1 | 8 | 0.0000000000E+00 | 0.0000000000E+00 | 0.0000000000E+00 |
| 0 | 9 | 1.4273361665E−19 | 2.7120450086E−18 | −7.3001740686E−24 |
| 10 | 0 | −4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | 1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | −4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | 1.6635528854E−20 | 7.1095903578E−22 | 5.3614470963E−26 |
| 3 | 7 | 0.0000000000E+00 | 0.0000000000E+00 | 0.0000000000E+00 |
| 2 | 8 | 2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | −2.0146570252E−20 | −1.2575068082E−20 | 8.2400402372E−26 |

Example 1

Figure 5:
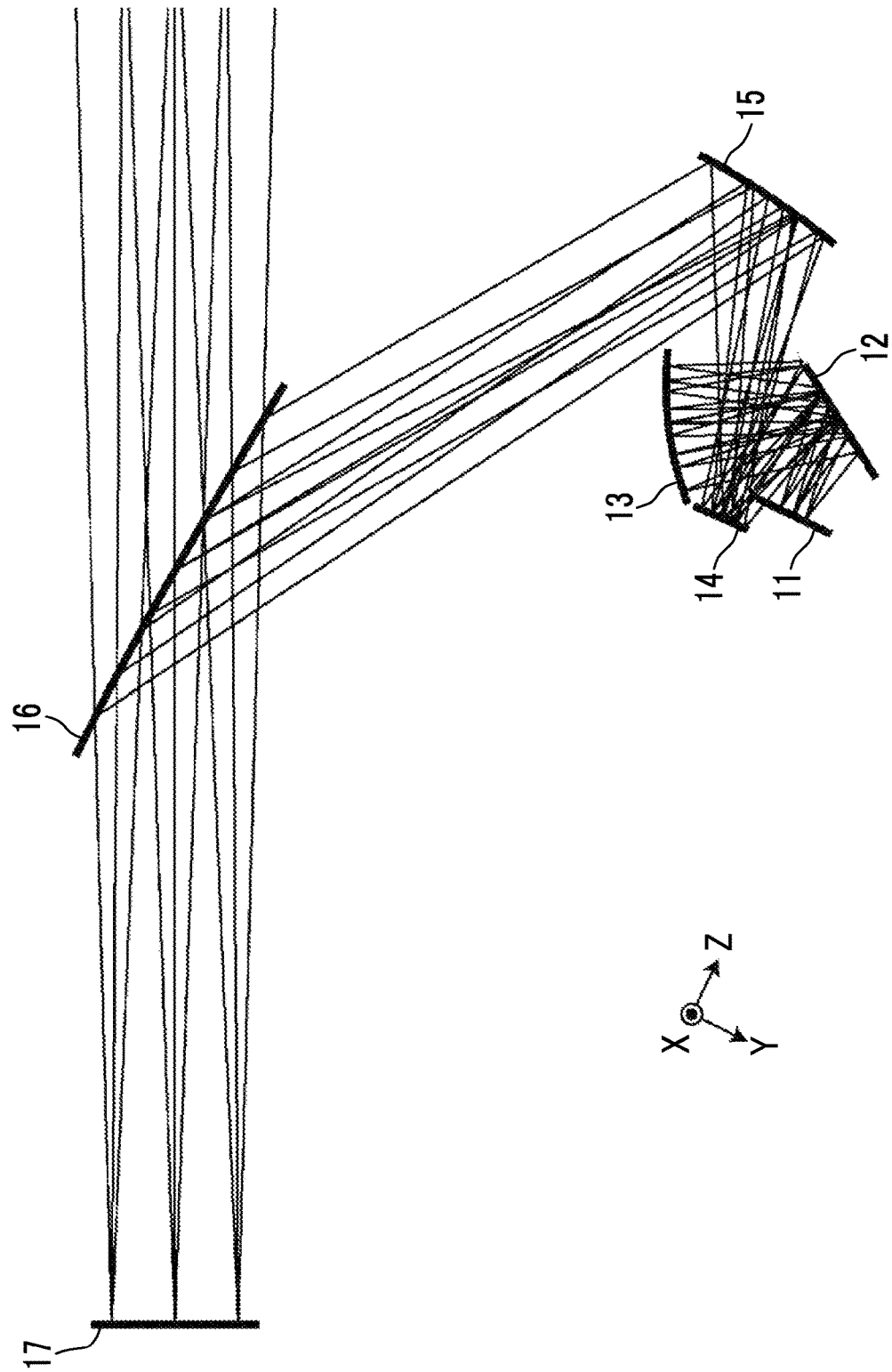
FIG. 5 is a diagram showing the schematic configuration of a head-up display device of Example 1 of the invention.

Next, a head-up display device of Example 1 of the invention will be described. FIG. 5 is a diagram showing the schematic configuration of the head-up display device of Example 1.

The head-up display device of Example 1 is composed of a plane mirror 12, a concave mirror 13, a plane mirror 14, a concave mirror 15, and a windshield 16 that are arranged along the optical path of display light in order from an image display surface 11 side. Reference numeral 17 in FIG. 5 denotes an eye box.

A first optical system is composed of the plane mirror 12, the concave mirror 13, and the plane mirror 14 that are arranged along the optical path of display light in order from the image display surface 11 side. The plane mirror 12 functions as a double reflection mirror that reflects display light twice on the optical path of the display light. A second optical system is composed of only the concave mirror 15.

An intermediate image is formed between the first and second optical systems on the optical path.

Table 7 shows data regarding the specifications of the head-up display device of Example 1, Table 8 shows the arrangement coordinate data of the respective elements of the head-up display device, and Table 9 shows data regarding the free-form surface coefficients of the respective surfaces.

TABLE 7

|  | Example 1 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 8

| Example 1 | Coordinates of origin | | | Normal vector to reference plane | | | Aperture data | | |
|---|---|---|---|---|---|---|---|---|---|
|  | x | y | z | i | j | k | Aperture width X | Aperture width Y | Aperture Y shift |
| Image display surface | 0.00 | 0.00 | 0.00 | 0.0000 | 0.0000 | 1.0000 |  |  |  |
| (*) Plane mirror | 0.00 | 2.50 | 125.66 | 0.0000 | 0.5274 | 0.8496 |  |  |  |
| First concave mirror | 0.00 | −180.62 | 35.00 | 0.0000 | 0.8541 | 0.5201 | 202 | 186 | −5.5 |
| (**) Plane mirror | 0.00 | −62.62 | −39.30 | 0.0000 | −0.0349 | 0.9994 |  |  |  |
| (**) Aperture | 0.00 | −114.63 | 169.31 | 0.0000 | −0.4848 | 0.8746 |  |  |  |
| Second concave mirror | 0.00 | −153.34 | 324.56 | 0.0000 | 0.1736 | 0.9848 | 390 | 192 | 38.5 |
| Windshield | 0.00 | −628.65 | −380.12 | 0.0000 | 0.9976 | −0.0698 | 402 | 508 | 3.5 |
| Eye box | 0.00 | −234.12 | −1189.04 | 0.0000 | 0.4384 | −0.8988 |  |  |  |
| Virtual image | 0.00 | −4617.83 | 7798.90 | 0.0000 | 0.4384 | −0.8988 |  |  |  |

TABLE 9

|  |  | Example 1 | | |
|---|---|---|---|---|
|  |  | First concave mirror | Second concave mirror | Windshield |
| R |  | 304.8155 | −2159.9481 | ∞ |
| C(i, j) | | | | |
| 1 | 0 | 0.0000000000E+00 | 0.0000000000E+00 | 0.0000000000E+00 |
| 0 | 1 | 1.3859772387E−02 | 4.5476828386E−03 | 9.5121514901E−03 |
| 2 | 0 | −2.2856377417E−04 | −3.6901373056E−04 | 1.1726714047E−04 |
| 1 | 1 | 0.0000000000E+00 | 0.0000000000E+00 | 0.0000000000E+00 |
| 0 | 2 | −3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | 2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | 8.4592795222E−07 | −4.1131478999E−07 | 5.8352454395E−08 |
| 4 | 0 | −6.0505271069E−10 | −3.8577727005E−10 | 1.8076488220E−10 |
| 3 | 1 | 0.0000000000E+00 | 0.0000000000E+00 | 0.0000000000E+00 |
| 2 | 2 | 2.4268195530E−09 | −91283326518E−10 | −8.5663602372E−11 |
| 1 | 3 | 0.0000000000E+00 | 0.0000000000E+00 | 0.0000000000E+00 |
| 0 | 4 | −5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | 1.0004211250E−12 | −9.0155142741E−12 | 1.6953219966E−13 |
| 3 | 2 | 0.0000000000E+00 | 0.0000000000E+00 | 0.0000000000E+00 |
| 2 | 3 | −5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | −2.6250295222E−12 | −1.8970231477E−10 | 4.3631225108E−14 |
| 6 | 0 | −3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | −8.7867903653E−13 | 4.2695230719E−14 | 1.2160292018E−15 |

TABLE 9-continued

Example 1

| | | First concave mirror | Second concave mirror | Windshield |
|---|---|---|---|---|
| 3 | 3 | 0.0000000000E+00 | 0.0000000000E+00 | 0.0000000000E+00 |
| 2 | 4 | −2.1379011091E−12 | 2.6656951958E−14 | 3.9230162978E−16 |
| 1 | 5 | 0.0000000000E+00 | 0.0000000000E+00 | 0.0000000000E+00 |
| 0 | 6 | 1.2381023067E−12 | 4.9842077884E−12 | 2.0358629739E−16 |
| 7 | 0 | 0.0000000000E+00 | 0.0000000000E+00 | 0.0000000000E+00 |
| 6 | 1 | −9.4521887356E−16 | 4.3523873670E−16 | −2.9914127753E−18 |
| 5 | 2 | 0.0000000000E+00 | 0.0000000000E+00 | 0.0000000000E+00 |
| 3 | 4 | 1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | 8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | −9.8281510176E−16 | 7.8442999372E−14 | 5.7818036623E−19 |
| 8 | 0 | −1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | 1.5901981672E−16 | −1.2991612077E−18 | −4.0929595963E−20 |
| 5 | 3 | 0.0000000000E+00 | 0.0000000000E+00 | 0.0000000000E+00 |
| 4 | 4 | 9.0779351210E−17 | 2.5009900231E−17 | −1.2197758236E−20 |
| 3 | 5 | 0.0000000000E+00 | 0.0000000000E+00 | 0.0000000000E+00 |
| 2 | 6 | 3.9879044384E−16 | −1.5202620743E−16 | −5.1769216490E−21 |
| 1 | 7 | 0.0000000000E+00 | 0.0000000000E+00 | 0.0000000000E+00 |
| 0 | 8 | −3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | 6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | −1.1527432752E−18 | 5.5525079488E−21 | 1.4456081800E−22 |
| 5 | 4 | 0.0000000000E+00 | 0.0000000000E+00 | 0.0000000000E+00 |
| 4 | 5 | 2.9326718944E−19 | 2.9724447109E−19 | 1.2455653871E−23 |
| 3 | 6 | 0.0000000000E+00 | 0.0000000000E+00 | 0.0000000000E+00 |
| 2 | 7 | −6.9251238563E−19 | −1.5830478324E−18 | −6.9948609813E−24 |
| 1 | 8 | 0.0000000000E+00 | 0.0000000000E+00 | 0.0000000000E+00 |
| 0 | 9 | −1.4273361665E−19 | −2.7120450086E−18 | −7.3001740686E−24 |
| 10 | 0 | 4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | −1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | 4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | −1.6635528854E−20 | 7.1095903578E−22 | 5.3614470963E−26 |
| 3 | 7 | 0.0000000000E+00 | 0.0000000000E+00 | 0.0000000000E+00 |
| 2 | 8 | −21925693161E−20 | −4.7379935239E−21 | 8.4180607892E−26 |
| 1 | 9 | 0.0000000000E+00 | 0.0000000000E+00 | 0.0000000000E+00 |
| 0 | 10 | 2.0146570252E−20 | −1.2575068082E−20 | 8.2400402372E−26 |

Example 2

Figure 6:
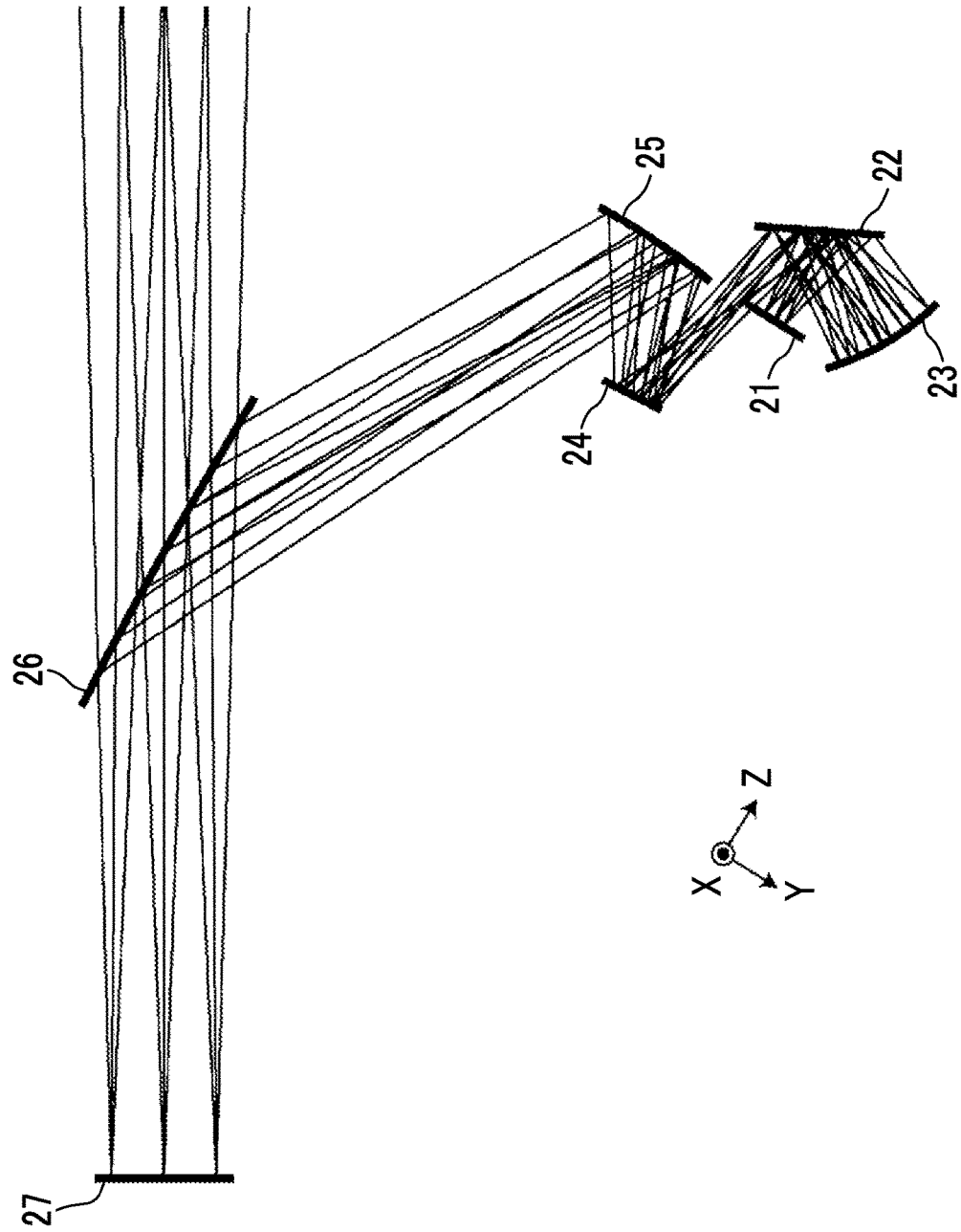
FIG. 6 is a diagram showing the schematic configuration of a head-up display device of Example 2 of the invention.

Next, a head-up display device of Example 2 of the invention will be described. FIG. 6 is a diagram showing the schematic configuration of the head-up display device of Example 2.

The head-up display device of Example 2 is composed of a plane mirror 22, a concave mirror 23, a plane mirror 24, a concave mirror 25, and a windshield 26 that are arranged along the optical path of display light in order from an image display surface 21 side. Reference numeral 27 in FIG. 6 denotes an eye box.

A first optical system is composed of the plane mirror 22 and the concave mirror 23 that are arranged along the optical path in order from the image display surface 21 side. The plane mirror 22 functions as a double reflection mirror that reflects display light twice on the optical path of the display light. A second optical system is composed of the plane mirror 24 and the concave mirror 25 that are arranged along the optical path in order from the image display surface 21 side. An intermediate image is formed between the first and second optical systems on the optical path.

Table 10 shows data regarding the specifications of the head-up display device of Example 2, Table 11 shows the arrangement coordinate data of the respective elements of the head-up display device, and Table 12 shows data regarding the free-form surface coefficients of the respective surfaces.

TABLE 10

| | Example 2 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 11

| Example 2 | Coordinates of origin | | | Normal vector to reference plane | | | Aperture data | | |
|---|---|---|---|---|---|---|---|---|---|
| | x | y | z | i | j | k | Aperture width X | Aperture width Y | Aperture Y shift |
| Image display surface | 0.00 | 0.00 | 0.00 | 0.0000 | 0.0000 | 1.0000 | | | |
| (*) Plane mirror | 0.00 | 2.50 | 152.16 | 0.0000 | −0.4695 | 0.8829 | | | |
| First concave mirror | 0.00 | 149.93 | 52.72 | 0.0000 | −0.8746 | 0.4848 | 202 | 186 | −5.5 |
| (**) Plane mirror | 0.00 | −90.40 | −196.87 | 0.0000 | −0.0872 | 0.9962 | | | |
| Second concave mirror | 0.00 | −163.94 | 5.16 | 0.0000 | 0.0698 | 0.9976 | 390 | 192 | 38.5 |
| Windshield | 0.00 | −562.99 | −745.34 | 0.0000 | 0.9994 | 0.0349 | 402 | 508 | 3.5 |
| Eye box | 0.00 | −86.06 | −1508.59 | 0.0000 | 0.5299 | −0.8480 | | | |
| Virtual image | 0.00 | −5385.25 | 6971.89 | 0.0000 | 0.5299 | −0.8480 | | | |

TABLE 12

| | | Example 2 | | |
|---|---|---|---|---|
| | | First concave mirror | Second concave mirror | Windshield |
| R | | 304.8155 | −2159.9481 | ∞ |
| C(i, j) | | | | |
| 1 | 0 | 0.0000000000E+00 | 0.0000000000E+00 | 0.0000000000E+00 |
| 0 | 1 | 1.3869772387E−02 | 4.5476828386E−03 | 9.5121514901E−03 |
| 2 | 0 | 2.2856377417E−04 | 3.6901373056E−04 | 1.1726714047E−04 |
| 1 | 1 | 0.0000000000E+00 | 0.0000000000E+00 | 0.0000000000E+00 |
| 0 | 2 | −3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | 2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | 8.4592795222E−07 | −4.1131478999E−07 | 5.8352454395E−08 |
| 4 | 0 | −6.0505271069E−10 | −3.8577727005E−10 | 1.8076488220E−10 |
| 3 | 1 | 0.0000000000E+00 | 0.0000000000E+00 | 0.0000000000E+00 |
| 2 | 2 | 2.4268195530E−09 | −9.1283326518E−10 | −8.5663602372E−11 |
| 1 | 3 | 0.0000000000E+00 | 0.0000000000E+00 | 0.0000000000E+00 |
| 0 | 4 | −5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | 1.0004211250E−12 | −9.0156142741E−12 | 1.6953219966E−13 |
| 3 | 2 | 0.0000000000E+00 | 0.0000000000E+00 | 0.0000000000E+00 |
| 2 | 3 | −5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | −2.6250295222E−12 | −1.8970231477E−10 | 4.3631225108E−14 |
| 6 | 0 | −3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | −8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | −2.1379011091E−12 | 2.6656951958E−14 | 3.9230162978E−16 |
| 1 | 5 | 0.0000000000E+00 | 0.0000000000E+00 | 0.0000000000E+00 |
| 0 | 6 | 1.2381023087E−12 | 4.9842077884E−12 | 2.0358629739E−16 |
| 7 | 0 | 0.0000000000E+00 | 0.0000000000E+00 | 0.0000000000E+00 |
| 6 | 1 | −9.4521887356E−16 | 4.3523873670E−16 | 2.9914127753E−18 |
| 5 | 2 | 0.0000000000E+00 | 0.0000000000E+00 | 0.0000000000E+00 |
| 3 | 4 | 1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | 8.8949040563E−15 | −3.7196368706E−15 | 5.6825058659E−20 |
| 1 | 6 | 0.0000000000E+00 | 0.0000000000E+00 | 0.0000000000E+00 |
| 0 | 7 | −9.8281510176E−16 | 7.8442999372E−14 | 5.7818036623E−19 |
| 8 | 0 | −1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | 1.5901981672E−16 | −1.2991612077E−18 | −4.0929595963E−20 |
| 5 | 3 | 0.0000000000E+00 | 0.0000000000E+00 | 0.0000000000E+00 |
| 4 | 4 | 9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | 3.9879044384E−16 | −1.5202620743E−16 | −5.1769216490E−21 |
| 1 | 7 | 0.0000000000E+00 | 0.0000000000E+00 | 0.0000000000E+00 |
| 0 | 8 | −3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | 6.9870498111E−20 | −7.0763125917E−21 | 2.2144541119E−23 |
| 7 | 2 | 0.0000000000E+00 | 0.0000000000E+00 | 0.0000000000E+00 |
| 5 | 3 | −1.1527432752E−18 | 5.5525079488E−21 | 1.4456081800E−22 |

TABLE 12-continued

| | | Example 2 | | |
|---|---|---|---|---|
| | | First concave mirror | Second concave mirror | Windshield |
| 5 | 4 | 0.0000000000E+00 | 0.0000000000E+00 | 0.0000000000E+00 |
| 4 | 5 | 2.9326718944E−19 | 2.9724447109E−19 | 1.2455653871E−23 |
| 3 | 8 | 0.0000000000E+00 | 0.0000000000E+00 | 0.0000000000E+00 |
| 2 | 7 | −6.9251238568E−19 | 1.5830478324E−18 | −6.9948609813E−24 |
| 1 | 8 | 0.0000000000E+00 | 0.0000000000E+00 | 0.0000000000E+00 |
| 0 | 9 | −1.4273361665E−19 | −2.7120450086E−18 | −7.3001746686E−24 |
| 10 | 0 | 4.8994391050E−22 | −3.3688981476E−24 | 1.3871955134E−24 |
| 9 | 1 | 0.0000000000E+00 | 0.0000000000E+00 | 0.0000000000E+00 |
| 8 | 2 | −1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | 4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | −1.6635528854E−20 | 7.1095903578E−22 | 5.3614470963E−26 |
| 3 | 7 | 0.0000000000E+00 | 0.0000000000E+00 | 0.0000000000E+00 |
| 2 | 8 | −2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | 2.0146570252E−20 | −1.2575068082E−20 | 8.2400402372E−26 |

Example 3

Figure 7:
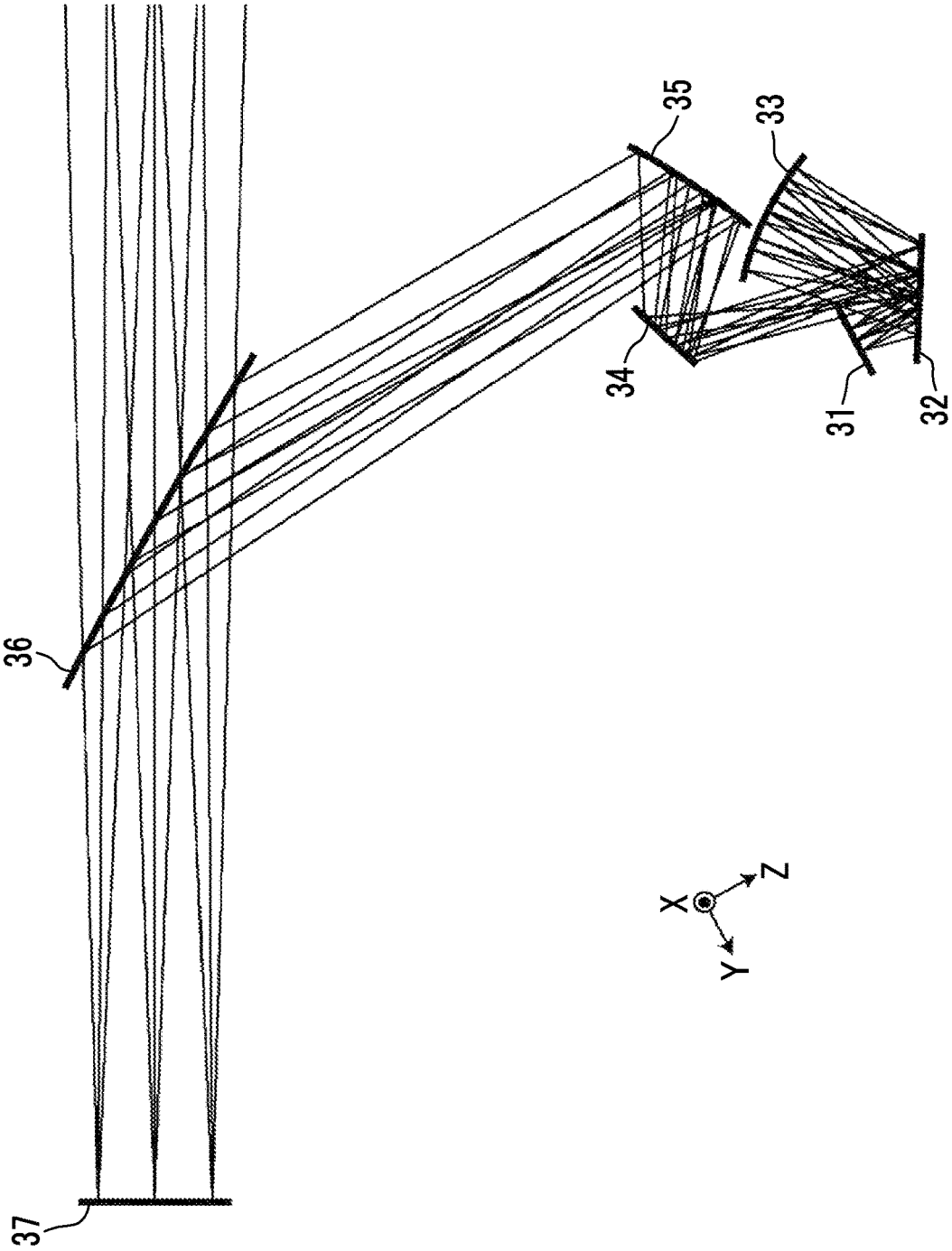
FIG. 7 is a diagram showing the schematic configuration of a head-up display device of Example 3 of the invention.

Next, a head-up display device of Example 3 of the invention will be described. FIG. 7 is a diagram showing the schematic configuration of the head-up display device of Example 3.

The head-up display device of Example 3 is composed of a plane mirror 32, a concave mirror 33, a plane mirror 34, a concave mirror 35, and a windshield 36 that are arranged along the optical path of display light in order from an image display surface 31 side. Reference numeral 37 in FIG. 7 denotes an eye box.

A first optical system is composed of the plane mirror 32 and the concave mirror 33 that are arranged along the optical path in order from the image display surface 31 side. The plane mirror 32 functions as a double reflection mirror that reflects display light twice on the optical path of the display light. A second optical system is composed of the plane mirror 34 and the concave mirror 35 that are arranged along the optical path in order from the image display surface 31 side. An intermediate image is formed between the first and second optical systems on the optical path.

Table 13 shows data regarding the specifications of the head-up display device of Example 3, Table 14 shows the arrangement coordinate data of the respective elements of the head-up display device, and Table 15 shows data regarding the free-form surface coefficients of the respective surfaces.

TABLE 13

| | Example 3 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 14

| | Coordinates of origin | | | Normal vector to reference plane | | | Aperture data | | |
|---|---|---|---|---|---|---|---|---|---|
| Example 3 | x | y | z | i | j | k | Aperture width X | Aperture width Y | Aperture Y shift |
| Image display surface | 0.00 | 0.00 | 0.00 | 0.0000 | 0.0000 | 1.0000 | | | |
| (*) Plane mirror | 0.00 | 2.50 | 93.77 | 0.0000 | 0.5075 | 0.8616 | | | |
| First concave mirror | 0.00 | −204.11 | −20.75 | 0.0000 | 0.8290 | 0.5592 | 202 | 186 | −5.5 |
| (**) Aperture | 0.00 | −76.51 | −118.09 | 0.0000 | 0.1736 | 0.9848 | | | |
| (**) Plane mirror | 0.00 | −92.14 | −206.72 | 0.0000 | −0.3420 | 0.9397 | | | |
| Second concave mirror | 0.00 | −249.18 | −74.95 | 0.0000 | −0.4384 | 0.8988 | 390 | 192 | 38.5 |
| Windshield | 0.00 | −219.51 | −924.43 | 0.0000 | 0.8480 | 0.5299 | 402 | 508 | 3.5 |
| Eye box | 0.00 | 575.14 | −1346.96 | 0.0000 | 0.8829 | −0.4695 | | | |
| Virtual image | 0.00 | −8254.34 | 3347.76 | 0.0000 | 0.8829 | −0.4695 | | | |

TABLE 15

| | | Example 3 | | |
|---|---|---|---|---|
| | | First concave mirror | Second concave mirror | Windshield |
| R | | 304.8155 | −2159.9481 | ∞ |
| C(i, j) | | | | |
| 1 | 0 | 0.0000000000E+00 | 0.0000000000E+00 | 0.0000000000E+00 |
| 0 | 1 | 1.3869772387E−02 | 4.5476828386E−03 | 9.5121514901E−03 |
| 2 | 0 | −2.2856377417E−04 | −3.6901373056E−04 | 1.1726714047E−04 |
| 1 | 1 | 0.0000000000E+00 | 0.0000000000E+00 | 0.0000000000E+00 |
| 0 | 2 | 3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | 2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | 8.4592795222E−07 | −4.1131478999E−07 | 5.8352454395E−08 |
| 4 | 0 | −6.0505271069E−10 | −3.8577727005E−10 | 1.8076488220E−10 |
| 3 | 1 | 0.0000000000E+00 | 0.0000000000E+00 | 0.0000000000E+00 |
| 2 | 2 | 24268195530E−09 | −9.1283326518E−10 | −8.5663602372E−11 |
| 1 | 3 | 0.0000000000E+00 | 0.0000000000E+00 | 0.0000000000E+00 |
| 0 | 4 | −5.2017921913E−09 | −2.4273686379E−08 | 5.1841972382E−11 |
| 5 | 0 | 0.0000000000E+00 | 0.0000000000E+00 | 0.0000000000E+00 |
| 4 | 1 | 1.0004211250E−12 | −9.0156142741E−12 | 1.6953219966E−13 |
| 3 | 2 | 0.0000000000E+00 | 0.0000000000E+00 | 0.0000000000E+00 |
| 2 | 3 | −5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | −2.6250295222E−12 | −1.8970231477E−10 | 43631225108E−14 |
| 6 | 0 | −3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | −8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | −2.1379011091E−12 | 2.6656951958E−14 | 39230162978E−16 |
| 1 | 5 | 0.0000000000E+00 | 0.0000000000E+00 | 00000000000E+00 |
| 0 | 6 | 1.2381023087E−12 | 4.9842077884E−12 | 2.0358629739E−16 |
| 7 | 0 | 0.0000000000E+00 | 0.0000000000E+00 | 0.0000000000E+00 |
| 0 | 1 | −9.4521887356E−16 | 4.3523873670E−16 | 2.9914127753E−18 |
| 5 | 2 | 0.0000000000E+00 | 0.0000000000E+00 | 00000000000E+00 |
| 3 | 4 | 1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | 8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | −9.8281510176E−16 | 7.8442999372E−14 | 5.7818036623E−19 |
| 8 | 0 | −1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | 1.5901981572E−16 | −1.2991612077E−18 | −4.0929595963E−20 |
| 5 | 3 | 0.0000000000E+00 | 0.0000000000E+00 | 0.0000000000E+00 |
| 4 | 4 | 9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | 3.9879044384E−16 | −1.5202620743E−16 | −5.1769216490E−21 |
| 1 | 7 | 0.0000000000E+00 | 0.0000000000E+00 | 0.0000000000E+00 |
| 0 | 8 | −3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | 6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | −1.1527432752E−18 | 5.5525079488E−21 | 1.4456081800E−22 |
| 5 | 4 | 0.0000000000E+00 | 0.0000000000E+00 | 0.0000000000E+00 |
| 4 | 5 | 2.9326718944E−19 | 2.9724447109E−19 | 1.2455653871E−23 |
| 3 | 6 | 0.0000000000E+00 | 0.0000000000E+00 | 0.0000000000E+00 |
| 2 | 7 | −6.9251238568E−19 | −1.5830478324E−18 | −6.9948609813E−24 |
| 1 | 8 | 0.0000000000E+00 | 0.0000000000E+00 | 0.0000000000E+00 |
| 0 | 9 | −1.4273361665E−19 | −2.7120450086E−18 | −7.3001740686E−24 |
| 10 | 0 | 4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | −1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | 4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | −1.6635528854E−20 | 7.2095903578E−22 | 5.3614470963E−26 |
| 3 | 7 | 0.0000000000E+00 | 0.0000000000E+00 | 0.0000000000E+00 |
| 2 | 8 | −2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | 2.0146570252E−20 | −1.2575068082E−20 | 8.2400402372E−26 |

Example 4

Figure 8:
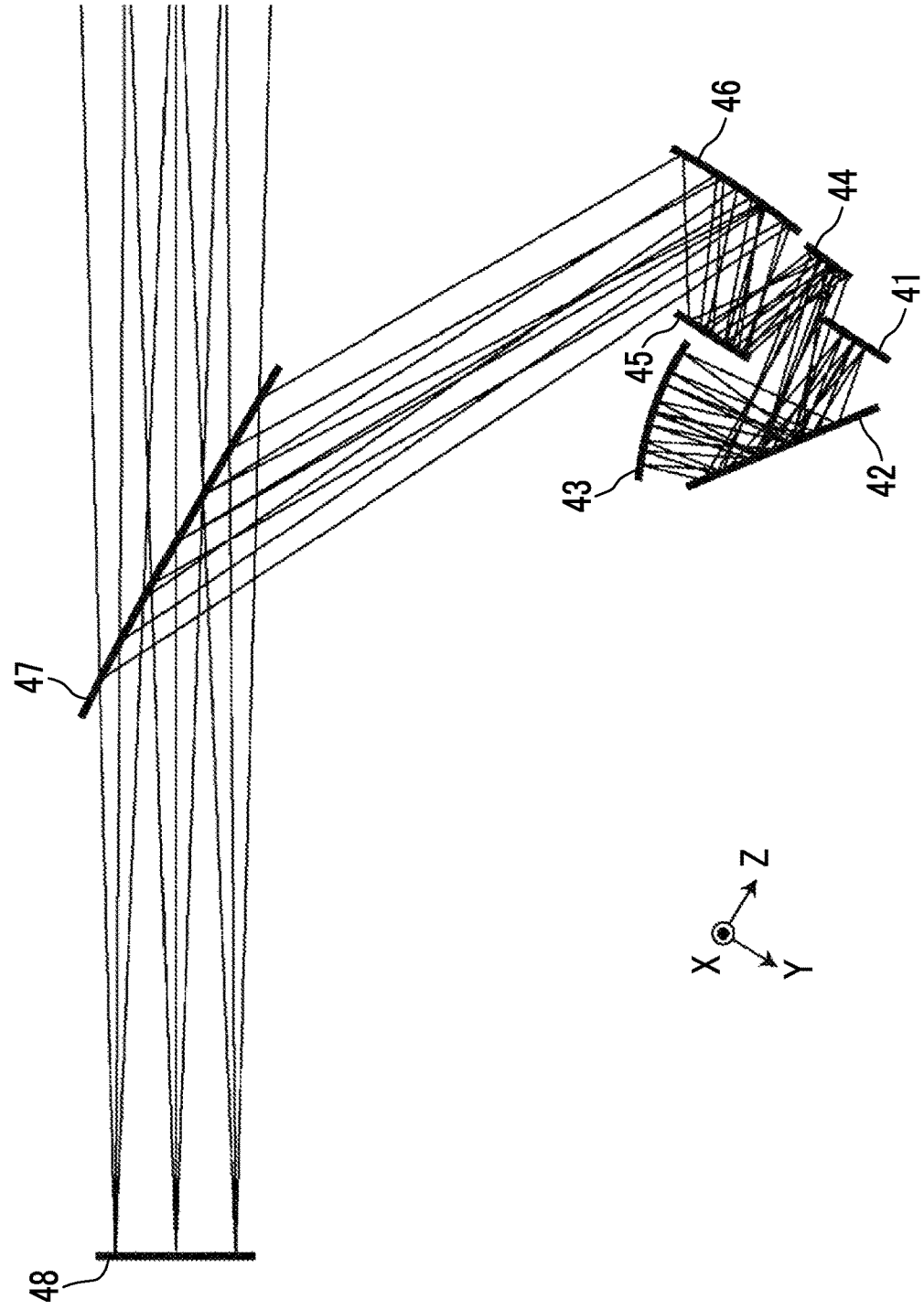
FIG. 8 is a diagram showing the schematic configuration of a head-up display device of Example 4 of the invention.

Next, a head-up display device of Example 4 of the invention will be described. FIG. 8 is a diagram showing the schematic configuration of the head-up display device of Example 4.

The head-up display device of Example 4 is composed of a plane mirror 42, a concave mirror 43, a plane mirror 44, a plane mirror 45, a concave mirror 46, and a windshield 47 that are arranged along the optical path of display light in order from an image display surface 41 side. Reference numeral 48 in FIG. 8 denotes an eye box.

A first optical system is composed of the plane mirror 42, the concave mirror 43, and the plane mirror 44 that are arranged along the optical path in order from the image display surface 41 side. The plane mirror 42 functions as a double reflection mirror that reflects display light twice on the optical path of the display light. A second optical system is composed of the plane mirror 45 and the concave mirror 46 that are arranged along the optical path in order from the image display surface 41 side. An intermediate image is formed between the first and second optical systems on the optical path.

Table 16 shows data regarding the specifications of the head-up display device of Example 4, Table 17 shows the arrangement coordinate data of the respective elements of the head-up display device, and Table 18 shows data regarding the free-form surface coefficients of the respective surfaces.

TABLE 16

|  | Example 4 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 17

| Example 4 | Coordinates of origin | | | Normal vector to reference plane | | | Aperture data | | |
|---|---|---|---|---|---|---|---|---|---|
|  | x | y | z | i | j | k | Aperture width X | Aperture width Y | Aperture Y shift |
| Image display surface | 0.00 | 0.00 | 0.00 | 0.0000 | 0.0000 | 1.0000 | | | |
| (*) Plane mirror | 0.00 | 2.50 | −152.12 | 0.0000 | −0.8171 | 0.5765 | | | |
| First concave mirror | 0.00 | −165.08 | −211.76 | 0.0000 | −0.9678 | −0.2519 | 202 | 186 | −5.5 |
| (**) Plane mirror | 0.00 | −66.96 | 63.92 | 0.0000 | 0.0872 | 0.9962 | | | |
| (**) Plane mirror | 0.00 | −123.39 | −91.13 | 0.0000 | 0.0000 | 1.0000 | | | |
| Second concave mirror | 0.00 | −186.67 | 82.72 | 0.0000 | 0.0698 | 0.9976 | 390 | 192 | 38.5 |
| Windshield | 0.00 | −585.72 | −667.79 | 0.0000 | 0.9994 | 0.0349 | 402 | 508 | 3.5 |
| Eye box | 0.00 | −108.79 | −1431.03 | 0.0000 | 0.5299 | −0.8480 | | | |
| Virtual image | 0.00 | −5407.98 | 7049.45 | 0.0000 | 0.5299 | −0.8480 | | | |

TABLE 18

| | | Example 4 | | |
|---|---|---|---|---|
| | | First concave mirror | Second concave mirror | Windshield |
| R | | −304.8155 | −2159.9481 | ∞ |
| C(i, j) | | | | |
| 1 | 0 | 0.0000000000E+00 | 0.0000000000E+00 | 0.0000000000E+00 |
| 0 | 1 | −1.3869772387E−02 | 4.5476828386E−03 | 9.5121514901E−03 |
| 2 | 0 | 2.2356377417E−04 | 3.6901373056E−04 | 1.1726714047E−04 |
| 1 | 1 | 0.0000000000E+00 | 0.0000000000E+00 | 0.0000000000E+00 |
| 0 | 2 | 3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | −2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | −8.4592795222E−07 | −4.1131478999E−07 | 5.6352454395E−08 |
| 4 | 0 | 6.0505271069E−10 | −3.8577270055−10 | 1.8076488220E−10 |
| 3 | 1 | 0.0000000000E+00 | 0.0000000000E+00 | 0.0000000000E+00 |
| 2 | 2 | −2.4268195530E−09 | −9.1283326518E−10 | −8.5663602372E−11 |
| 1 | 3 | 0.0000000000E+00 | 0.0000000000E+00 | 0.0000000000E+00 |
| 0 | 4 | 5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | −1.0004211250E−12 | −9.0156142741E−12 | 1.6953219966E−13 |
| 3 | 2 | 0.0000000000E+00 | 0.0000000000E+00 | 0.0000000000E+00 |
| 2 | 3 | 5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | 2.6250295222E−12 | −1.8970231477E−10 | 4.3631225108E−14 |
| 6 | 0 | 3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | 8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | 2.1379011091E−12 | 2.6656951958E−14 | 3.9230162978E−16 |
| 1 | 5 | 0.0000000000E+00 | 0.0000000000E+00 | 0.0000000000E+00 |
| 0 | 6 | −1.2381023087E−12 | 4.9842077884E−12 | 2.0358629739E−16 |
| 7 | 0 | 0.0000000000E+00 | 0.0000000000E+00 | 0.0000000000E+00 |
| 6 | 1 | 9.4521887356E−16 | 4.3523873670E−16 | −2.9914127753E−18 |

TABLE 18-continued

Example 4

| | | First concave mirror | Second concave mirror | Windshield |
|---|---|---|---|---|
| 5 | 2 | 0.0000000000E+00 | 0.0000000000E+00 | 0.0000000000E+00 |
| 3 | 4 | −1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | −8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | 9.8281510176E−16 | 7.8442999372E−14 | 5.7818036623E−19 |
| 8 | 0 | 1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | −1.5901981872E−16 | −1.2991612077E−18 | −4.0929595963E−20 |
| 5 | 3 | 0.0000000000E+00 | 0.0000000000E+00 | 0.0000000000E+00 |
| 4 | 4 | −9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | −3.9879044384E−16 | −1.5202620743E−16 | −5.1769216490E−21 |
| 1 | 7 | 0.0000000000E+00 | 0.0000000000E+00 | 0.0000000000E+00 |
| 0 | 8 | 3.1824986967E−16 | 1.5367508982E−16 | 6.4366746130E−21 |
| 9 | 0 | 0.0000000000E+00 | 0.0000000000E+00 | 0.0000000000E+00 |
| 8 | 1 | −6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | 1.1527432752E−18 | 5.5525079488E−21 | 1.4456081800E−22 |
| 5 | 4 | 0.0000000000E+00 | 0.0000000000E+00 | 0.0000000000E+00 |
| 4 | 5 | −2.9326718944E−19 | 2.9724447109E−19 | 1.2455653871E−23 |
| 3 | 6 | 0.0000000000E+00 | 0.0000000000E+00 | 0.0000000000E+00 |
| 2 | 7 | 6.9251238568E−19 | −1.5830478324E−18 | −6.9948609813E−24 |
| 1 | 8 | 0.0000000000E+00 | 0.0000000000E+00 | 0.0000000000E+00 |
| 0 | 9 | 1.4273361665E−19 | −2.7120450086E−18 | −7.3001740686E−24 |
| 10 | 0 | −4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | 1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | −4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | 1.6635528854E−20 | 7.1095903578E−22 | 5.3614470963E−26 |
| 3 | 7 | 0.0000000000E+00 | 0.0000000000E+00 | 0.0000000000E+00 |
| 2 | 8 | 2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | −2.0146570252E−20 | −1.2575068082E−20 | 8.2400402372E−26 |

Example 5

Figure 9:
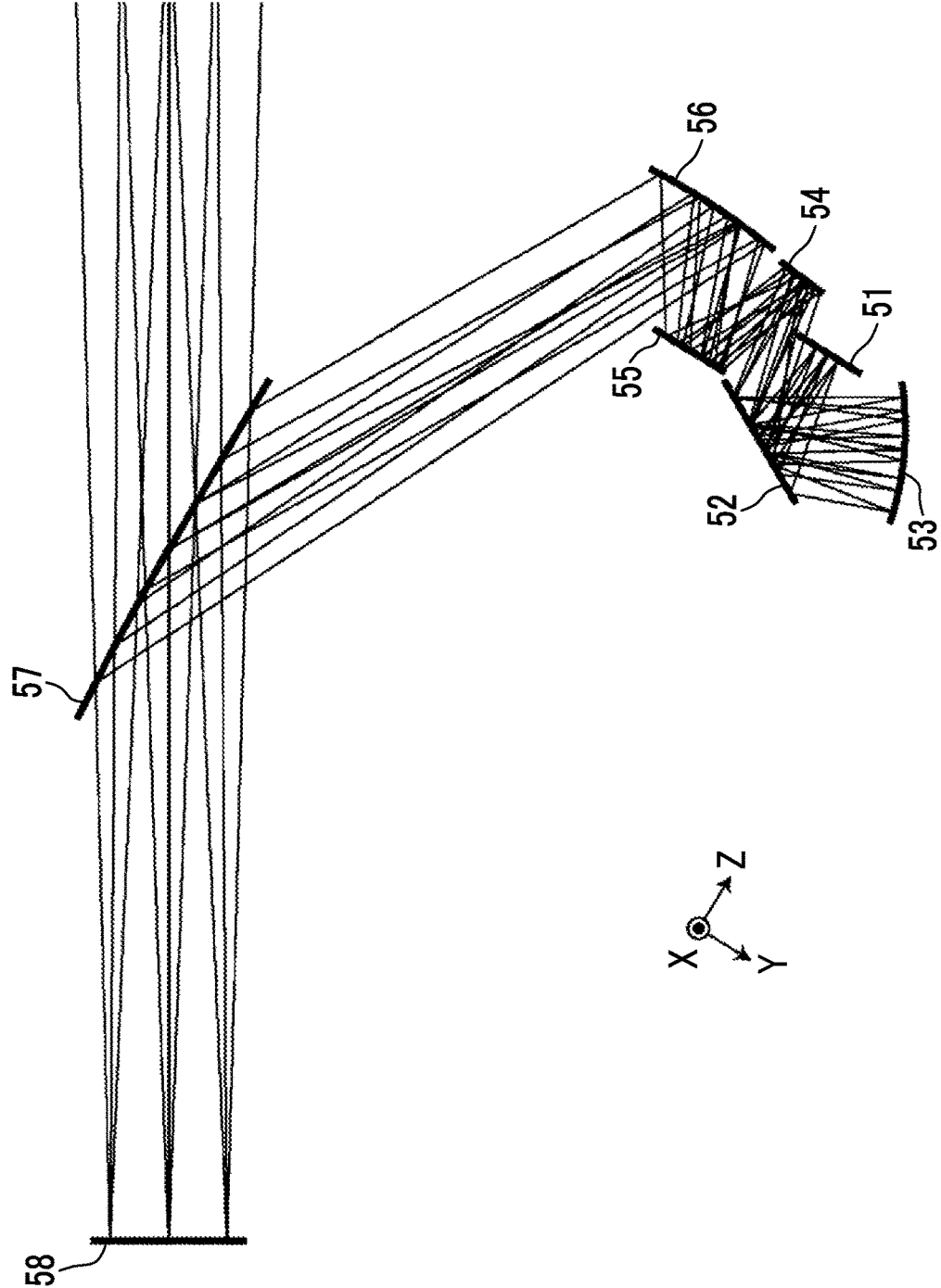
FIG. 9 is a diagram showing the schematic configuration of a head-up display device of Example 5 of the invention.

Next, a head-up display device of Example 5 of the invention will be described. FIG. 9 is a diagram showing the schematic configuration of the head-up display device of Example 5.

The head-up display device of Example 5 is composed of a plane mirror 52, a concave mirror 53, a plane mirror 54, a plane mirror 55, a concave mirror 56, and a windshield 57 that are arranged along the optical path of display light in order from an image display surface 51 side. Reference numeral 58 in FIG. 9 denotes an eye box.

A first optical system is composed of the plane mirror 52, the concave mirror 53, and the plane mirror 54 that are arranged along the optical path in order from the image display surface 51 side. The plane mirror 52 functions as a double reflection mirror that reflects display light twice on the optical path of the display light. A second optical system is composed of the plane mirror 55 and the concave mirror 56 that are arranged along the optical path in order from the image display surface 51 side. An intermediate image is formed between the first and second optical systems on the optical path.

Table 19 shows data regarding the specifications of the head-up display device of Example 5, Table 20 shows the arrangement coordinate data of the respective elements of the head-up display device, and Table 21 shows data regarding the free-form surface coefficients of the respective surfaces.

TABLE 19

| | Example 5 |
|---|---|
| FOV[H × V] | 10° × 4° |
| Eye box size [mm × mm] | 130 × 150 |
| Virtual image distance [mm] | 10000 |
| Image display region [mm × mm] | 90 × 36 |

TABLE 20

| | Coordinates of origin | | | Normal vector to reference plane | | | Aperture data | | |
|---|---|---|---|---|---|---|---|---|---|
| Example 5 | x | y | z | i | j | k | Aperture width X | Aperture width Y | Aperture Y shift |
| Image display surface | 0.00 | 0.00 | 0.00 | 0.0000 | 0.0000 | 1.0000 | | | |
| (*) Plane mirror | 0.00 | 2.50 | −152.16 | 0.0000 | 0.4695 | 0.8829 | | | |

TABLE 20-continued

| Example 5 | Coordinates of origin | | | Normal vector to reference plane | | | Aperture data | | |
|---|---|---|---|---|---|---|---|---|---|
| | x | y | z | i | j | k | Aperture width X | Aperture width Y | Aperture Y shift |
| First concave mirror | 0.00 | 149.93 | −52.72 | 0.0000 | 0.8746 | 0.4848 | 202 | 186 | −5.5 |
| (**) Plane mirror | 0.00 | −66.96 | 63.92 | 0.0000 | 0.0872 | 0.9962 | | | |
| (**) Plane mirror | 0.00 | −123.39 | −91.13 | 0.0000 | 0.0000 | 1.0000 | | | |
| Second concave mirror | 0.00 | −186.67 | 82.72 | 0.0000 | 0.0698 | 0.9976 | 390 | 192 | 38.5 |
| Windshield | 0.00 | −585.72 | −667.79 | 0.0000 | 0.9994 | 0.0349 | 402 | 508 | 3.5 |
| Eye box | 0.00 | −108.79 | −1431.03 | 0.0000 | 0.5299 | −0.8480 | | | |
| Virtual image | 0.00 | −5407.98 | 7049.45 | 0.0000 | 0.5299 | −0.8480 | | | |

TABLE 21

| | | Example 5 | | |
|---|---|---|---|---|
| | | First concave mirror | Second concave mirror | Windshield |
| R | | −304.8155 | −2159.9481 | ∞ |
| C(i, j) | | | | |
| 1 | 0 | 0.0000000000E+00 | 0.0000000000E+00 | 0.0000000000E+00 |
| 0 | 1 | −1.3869772387E−02 | 4.5476828386E−03 | 9.5121514901E−03 |
| 2 | 0 | 2.2856377417E−04 | −3.6901373056E−04 | 1.1726714047E−04 |
| 1 | 1 | 0.0000000000E+00 | 0.0000000000E+00 | 0.0000000000E+00 |
| 0 | 2 | 3.6913896522E−04 | −2.4288026890E−04 | 6.6451462078E−05 |
| 3 | 0 | 0.0000000000E+00 | 0.0000000000E+00 | 0.0000000000E+00 |
| 2 | 1 | −2.2697390753E−08 | −2.8767844343E−07 | −4.0984711760E−08 |
| 1 | 2 | 0.0000000000E+00 | 0.0000000000E+00 | 0.0000000000E+00 |
| 0 | 3 | −8.4592795222E−07 | −4.1131478999E−07 | 5.8352454355E−08 |
| 4 | 0 | 6.0505271069E−10 | −3.8577727005E−10 | 1.8076488220E−10 |
| 3 | 1 | 0.0000000000E+00 | 0.0000000000E+00 | 0.0000000000E+00 |
| 2 | 2 | −2.4268195530E−09 | −9.1283326518E−10 | −8.5663602372E−11 |
| 1 | 3 | 0.0000000000E+00 | 0.0000000000E+00 | 0.0000000000E+00 |
| 0 | 4 | 5.2017921913E−09 | −2.4273686379E−08 | 5.1841972882E−11 |
| 5 | 0 | 0.0000000000E+00 | 0.0000000000E+00 | 0.0000000000E+00 |
| 4 | 1 | −1.0004211250E−12 | −9.0156142741E−12 | 1.6953219956E−13 |
| 3 | 2 | 0.0000000000E+00 | 0.0000000000E+00 | 0.0000000000E+00 |
| 2 | 3 | 5.4253544695E−11 | 9.7024377121E−13 | 9.4181254950E−14 |
| 1 | 4 | 0.0000000000E+00 | 0.0000000000E+00 | 0.0000000000E+00 |
| 0 | 5 | 2.6250295222E−12 | −1.8970231477E−10 | 4.3631225108E−14 |
| 6 | 0 | 3.3099468778E−14 | 8.2343873777E−15 | −5.7915957618E−15 |
| 5 | 1 | 0.0000000000E+00 | 0.0000000000E+00 | 0.0000000000E+00 |
| 4 | 2 | 8.7867903653E−13 | 4.2695230719E−14 | 1.2160292018E−15 |
| 3 | 3 | 0.0000000000E+00 | 0.0000000000E+00 | 0.0000000000E+00 |
| 2 | 4 | 2.1379011091E−12 | 2.6556951958E−14 | 3.9230162978E−16 |
| 1 | 5 | 0.0000000000E+00 | 0.0000000000E+00 | 0.0000000000E+00 |
| 0 | 6 | −1.2381023087E−12 | 4.9842077884E−12 | 2.0358629739E−16 |
| 7 | 0 | 0.0000000000E+00 | 0.0000000000E+00 | 0.0000000000E+00 |
| 6 | 1 | 9.4521887356E−16 | 4.3523873670E−16 | −2.9914127753E−18 |
| 5 | 2 | 0.0000000000E+00 | 0.0000000000E+00 | 0.0000000000E+00 |
| 3 | 4 | −1.0850716298E−14 | 1.2269732633E−16 | −7.1848493425E−18 |
| 4 | 3 | 0.0000000000E+00 | 0.0000000000E+00 | 0.0000000000E+00 |
| 2 | 5 | −8.8949040563E−15 | −3.8719636870E−15 | 5.6825058659E−20 |
| 1 | 6 | 0.0000000000E+00 | 0.0000000000E+00 | 0.0000000000E+00 |
| 0 | 7 | 9.8281510176E−16 | 7.8442999372E−14 | 5.7818036623E−19 |
| 8 | 0 | 1.6050619873E−17 | 2.8176464650E−19 | 1.4548651606E−19 |
| 7 | 1 | 0.0000000000E+00 | 0.0000000000E+00 | 0.0000000000E+00 |
| 6 | 2 | −1.5901981672E−16 | −1.2991612077E−18 | −4.0929595963E−20 |
| 5 | 3 | 0.0000000000E+00 | 0.0000000000E+00 | 0.0000000000E+00 |
| 4 | 4 | −9.0779351210E−17 | 2.5009900231E−17 | −1.2197758235E−20 |
| 3 | 5 | 0.0000000000E+00 | 0.0000000000E+00 | 0.0000000000E+00 |
| 2 | 6 | −3.9879044384E−16 | −1.5202620743E−16 | −51769216490E−21 |
| 1 | 7 | 0.0000000000E+00 | 0.0000000000E+00 | 0.0000000000E+00 |
| 0 | 8 | 3.1824986967E−16 | 1.5367508982E−16 | −6.4366746130E−21 |
| 9 | 0 | 0.0000000000E+00 | 0.0000000000E+00 | 0.0000000000E+00 |
| 8 | 1 | −6.9870498111E−20 | −7.0763125917E−21 | 2.2144541119E−23 |
| 7 | 2 | 0.0000000000E+00 | 0.0000000000E+00 | 0.0000000000E+00 |
| 6 | 3 | 1.1527432752E−18 | 5.5525079488E−21 | 1.4456081800E−22 |
| 5 | 4 | 0.0000000000E+00 | 0.0000000000E+00 | 0.0000000000E+00 |
| 4 | 5 | −2.9326718944E−19 | 2.9724447109E−19 | 1.2455653871E−23 |
| 3 | 6 | 0.0000000000E+00 | 0.0000000000E+00 | 0.0000000000E+00 |

TABLE 21-continued

Example 5

| | | First concave mirror | Second concave mirror | Windshield |
|---|---|---|---|---|
| 2 | 7 | 6.9251238568E−19 | 1.5830478324E−18 | −6.9948609813E−24 |
| 1 | 8 | 0.0000000000E+00 | 0.0000000000E+00 | 0.0000000000E+00 |
| 0 | 9 | 1.4273361665E−19 | −2.7120450086E−18 | −7.3001740686E−24 |
| 10 | 0 | −4.8994391050E−22 | −8.3688981476E−24 | −1.3871955134E−24 |
| 9 | 1 | 0.0000000000E+00 | 0.0000000000E+00 | 0.0000000000E+00 |
| 8 | 2 | 1.3959330800E−20 | −9.2607370523E−24 | 5.3699663027E−25 |
| 7 | 3 | 0.0000000000E+00 | 0.0000000000E+00 | 0.0000000000E+00 |
| 6 | 4 | −4.1627084014E−21 | 1.3037488330E−22 | 2.5361779086E−25 |
| 5 | 5 | 0.0000000000E+00 | 0.0000000000E+00 | 0.0000000000E+00 |
| 4 | 6 | 1.6635528854E−20 | 7.1095903578E−22 | 5.3614470963E−26 |
| 3 | 7 | 0.0000000000E+00 | 0.0000000000E+00 | 0.0000000000E+00 |
| 2 | 8 | 2.1925693161E−20 | −4.7379935239E−21 | 8.4180607892E−26 |
| 1 | 9 | 0.0000000000E+00 | 0.0000000000E+00 | 0.0000000000E+00 |
| 0 | 10 | −2.0146570252E−20 | −1.2575068082E−20 | 8.2400402372E−26 |

Example 6

Figure 10:
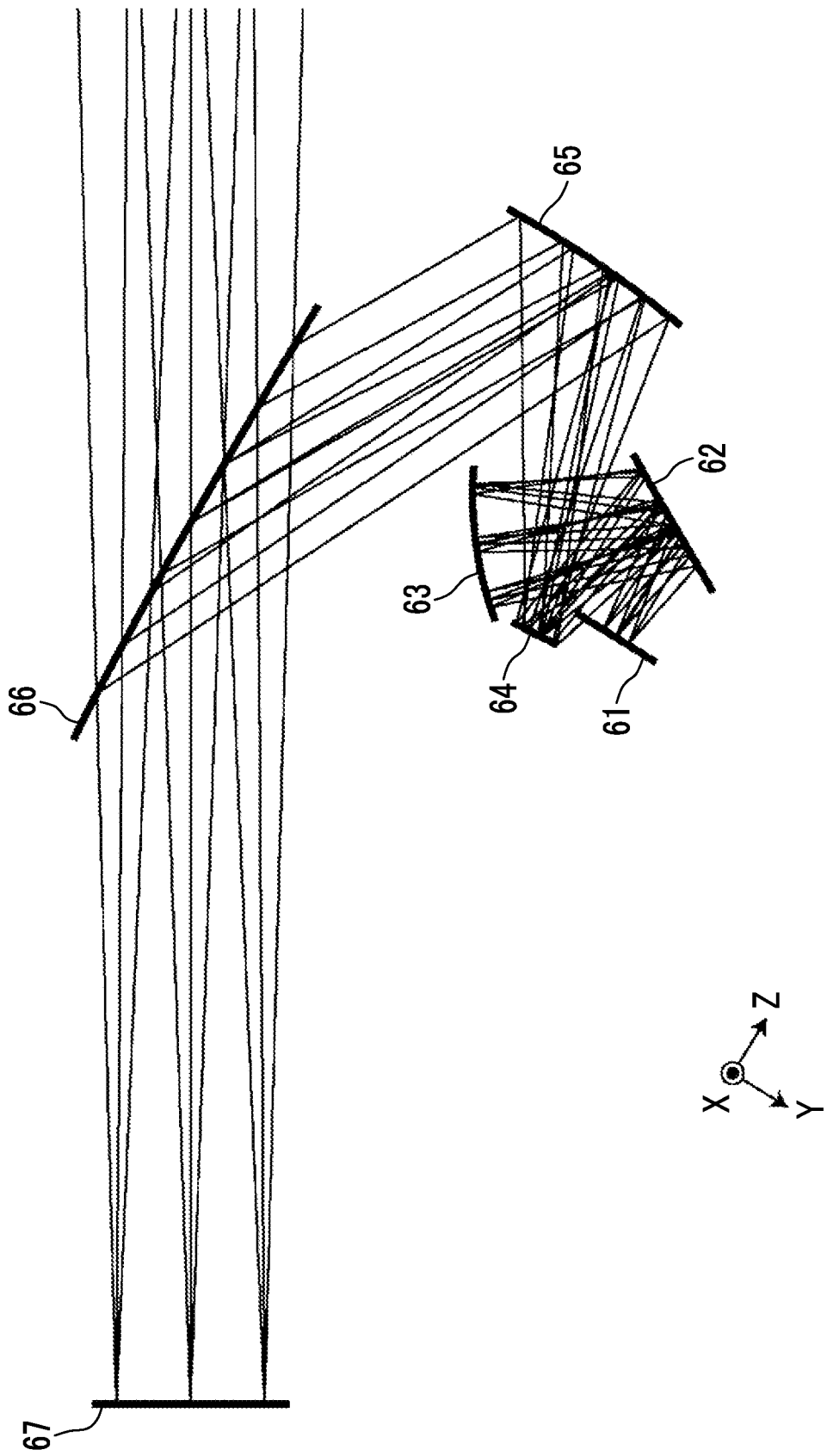
FIG. 10 is a diagram showing the schematic configuration of a head-up display device of Example 6 of the invention.

Next, a head-up display device of Example 6 of the invention will be described. FIG. 10 is a diagram showing the schematic configuration of the head-up display device of Example 6.

The head-up display device of Example 6 is composed of a plane mirror 62, a concave mirror 63, a plane mirror 64, a concave mirror 65, and a windshield 66 that are arranged along the optical path of display light in order from an image display surface 61 side. Reference numeral 67 in FIG. 10 denotes an eye box.

A first optical system is composed of the plane mirror 62, the concave mirror 63, and the plane mirror 64 that are arranged along the optical path of display light in order from the image display surface 61 side. The plane mirror 62 functions as a double reflection mirror that reflects display light twice on the optical path of the display light. A second optical system is composed of only the concave mirror 65. An intermediate image is formed between the first and second optical systems on the optical path.

Table 22 shows data regarding the specifications of the head-up display device of Example 6, Table 23 shows the arrangement coordinate data of the respective elements of the head-up display device, and Table 24 shows data regarding the free-form surface coefficients of the respective surfaces.

TABLE 22

| | Example 6 |
|---|---|
| FOV[H × V] | 10° × 4° |
| Eye box size [mm × mm] | 130 × 150 |
| Virtual image distance [mm] | 10000 |
| Image display region [mm × mm] | 87 × 34.8 |

TABLE 23

| | Coordinates of origin | | | Normal vector to reference plane | | | Aperture data | | |
|---|---|---|---|---|---|---|---|---|---|
| Example 6 | x | y | z | i | j | k | Aperture width X | Aperture width Y | Aperture Y shift |
| Image display surface | 0.00 | 0.00 | 0.00 | 0.0000 | 0.0000 | 0.0000 | | | |
| (*) Plane mirror | 0.00 | 1.65 | 122.40 | 0.0000 | 0.4695 | 0.8829 | | | |
| First concave mirror | 0.00 | −170.46 | 6.31 | 0.0000 | 0.7771 | 0.6293 | 154 | 160 | −1 |
| (**) Plane mirror | 0.00 | −63.47 | −39.31 | 0.0000 | −0.0872 | 0.9962 | | | |
| (**) Aperture | 0.00 | −128.45 | 139.23 | 0.0000 | −0.6018 | 0.7986 | | | |
| Second concave mirror | 0.00 | −191.73 | 313.08 | 0.0000 | 0.0698 | 0.9976 | 356 | 212 | 26.5 |
| Windshield | 0.00 | −426.46 | −128.40 | 0.0000 | 0.9994 | 0.0349 | 402 | 508 | 3.5 |
| Eye box | 0.00 | 50.46 | −891.64 | 0.0000 | 0.5299 | −0.8480 | | | |
| Virtual image | 0.00 | −5248.73 | 7588.84 | 0.0000 | 0.5299 | −0.8480 | | | |

TABLE 24

| | | Example 6 | | |
|---|---|---|---|---|
| | | First concave mirror | Second concave minor | Windshield |
| R | | 364.1496 | −1050.1502 | ∞ |
| C(i, j) | | | | |
| 1 | 0 | 0.0000000000E+00 | 0.0000000000E+00 | 0.0000000000E+00 |
| 0 | 1 | 8.2781494102E−03 | 6.8574207205E−03 | 9.5121514901E−03 |
| 2 | 0 | 7.2496483838E−05 | −1.0663210009E−04 | 1.1726714047E−04 |
| 1 | 1 | 0.0000000000E+00 | 0.0000000000E+00 | 0.0000000000E+00 |
| 0 | 2 | −2.1586738547E−05 | 9.5235470756E−06 | 6.6451462078E−05 |
| 3 | 0 | 0.0000000000E+00 | 0.0000000000E+00 | 0.0000000000E+00 |
| 2 | 1 | 5.2012646030E−08 | −3.6063804179E−07 | −4.0984711760E−08 |
| 1 | 2 | 0.0000000000E+00 | 0.0000000000E+00 | 0.0000000000E+00 |
| 0 | 3 | 4.1677823354E−07 | −2.6821203947E−08 | 5.8352454395E−08 |
| 4 | 0 | 3.5914576853E−09 | 7.2047049220E−11 | 1.8076488220E−10 |
| 3 | 1 | 0.0000000000E+00 | 0.0000000000E+00 | 0.0000000000E+00 |
| 2 | 2 | 4.8537618841E−09 | −9.4022875912E−10 | −8.5663602372E−11 |
| 1 | 3 | 0.0000000000E+00 | 0.0000000000E+00 | 0.0000000000E+00 |
| 0 | 4 | −1.8438315752E−09 | 1.5661591682E−09 | 5.1841972882E−11 |
| 5 | 0 | 0.0000000000E+00 | 0.0000000000E+00 | 0.0000000000E+00 |
| 4 | 1 | 8.0501134652E−11 | 1.4398088697E−12 | 1.6953219966E−13 |
| 3 | 2 | 0.0000000000E+00 | 0.0000000000E+00 | 0.0000000000E+00 |
| 2 | 3 | 2.9268364950E−11 | −1.3537660652E−12 | 9.4181254950E−14 |
| 1 | 4 | 0.0000000000E+00 | 0.0000000000E+00 | 0.0000000000E+00 |
| 0 | 5 | 1.7228449106E−11 | 7.2384713605E−12 | 4.3631225108E−14 |
| 6 | 0 | 2.2513657309E−12 | 7.3637571380E−15 | −5.7915957618E−15 |
| 5 | 1 | 0.0000000000E+00 | 0.0000000000E+00 | 0.0000000000E+00 |
| 4 | 2 | −4.6926792298E−13 | 1.0221808030E−13 | 1.2160292018E−15 |
| 3 | 3 | 0.0000000000E+00 | 0.0000000000E+00 | 0.0000000000E+00 |
| 2 | 4 | −9.0331557110E−14 | −1.9811218328E−15 | 3.9230162978E−16 |
| 1 | 5 | 0.0000000000E+00 | 0.0000000000E+00 | 0.0000000000E+00 |
| 0 | 6 | −7.7940278890E−14 | 1.3338961329E−14 | 2.0358629739E−16 |
| 7 | 0 | 0.0000000000E+00 | 0.0000000000E+00 | 0.0000000000E+00 |
| 6 | 1 | −5.4780235026E−14 | −1.8699693082E−17 | 2.9914127753E−18 |
| 5 | 2 | 0.0000000000E+00 | 0.0000000000E+00 | 0.0000000000E+00 |
| 3 | 4 | −2.5731950124E−14 | 5.8372891730E−17 | −7.1848493425E−18 |
| 4 | 3 | 0.0000000000E+00 | 0.0000000000E+00 | 0.0000000000E+00 |
| 2 | 5 | −3.4409574674E−15 | 9.7683910498E−17 | 5.6825058659E−20 |
| 1 | 6 | 0.0000000000E+00 | 0.0000000000E+00 | 0.0000000000E+00 |
| 0 | 7 | −6.6134020974E−16 | 1.7322759983E−16 | 5.7818036623E−19 |
| 8 | 0 | −1.3649302108E−15 | −3.7516062416E−19 | 1.4548651606E−19 |
| 6 | 1 | 0.0000000000E+00 | 0.0000000000E+00 | 0.0000000000E+00 |
| 5 | 2 | −9.8404634333E−17 | −2.4062282849E−18 | −4.0929595963E−20 |
| 5 | 3 | 0.0000000000E+00 | 0.0000000000E+00 | 0.0000000000E+00 |
| 4 | 4 | −5.9384774275E−16 | −6.4168355808E−19 | −1.2197758235E−20 |
| 3 | 5 | 0.0000000000E+00 | 0.0000000000E+00 | 0.0000000000E+00 |
| 2 | 6 | 6.9697211715E−17 | 6.3303825396E−19 | −5.1739216490E−21 |
| 1 | 7 | 0.0000000000E+00 | 0.0000000000E+00 | 0.0000000000E+00 |
| 0 | 8 | −3.7507666389E−18 | 4.8773109563E−19 | −6.4336746130E−21 |
| 9 | 0 | 0.0000000000E+00 | 0.0000000000E+00 | 0.0000000000E+00 |
| 8 | 1 | 9.0829686793E−18 | 7.5851397794E−23 | 2.2144541119E−23 |
| 7 | 2 | 0.0000000000E+00 | 0.0000000000E+00 | 0.0000000000E+00 |
| 6 | 3 | 5.4805017945E−18 | 1.5796582521E−21 | 1.4456081800E−22 |
| 5 | 4 | 0.0000000000E+00 | 0.0000000000E+00 | 0.0000000000E+00 |
| 4 | 5 | 1.5433344544E−18 | 4.5873173280E−21 | 1.2455653871E−23 |
| 3 | 6 | 0.0000000000E+00 | 0.0000000000E+00 | 0.0000000000E+00 |
| 2 | 7 | 2.0504688737E−19 | −1.3495281410E−20 | −6.9948609813E−24 |
| 1 | 8 | 0.0000000000E+00 | 0.0000000000E+00 | 0.0000000000E+00 |
| 0 | 9 | −9.7626245035E−20 | −4.4608874515E−22 | −7.3001740686E−24 |
| 10 | 0 | 1.9688538632E−19 | 6.8791039741E−24 | −1.3871955134E−24 |
| 9 | 1 | 0.0000000000E+00 | 0.0000000000E+00 | 0.0000000000E+00 |
| 8 | 2 | 4.1016446713E−20 | 1.7293629617E−23 | 5.3699663027E−25 |
| 7 | 3 | 0.0000000000E+00 | 0.0000000000E+00 | 0.0000000000E+00 |
| 6 | 4 | 8.0803276853E−20 | 3.6012669158E−23 | 2.5361779086E−25 |
| 5 | 5 | 0.0000000000E+00 | 0.0000000000E+00 | 0.0000000000E+00 |
| 4 | 6 | 8.3578692964E−20 | −1.1748637464E−24 | 5.3614470963E−26 |
| 3 | 7 | 0.0000000000E+00 | 0.0000000000E+00 | 0.0000000000E+00 |
| 2 | 8 | −2.6980035243E−20 | −7.2775351795E−23 | 8.4180607892E−26 |
| 1 | 9 | 0.0000000000E+00 | 0.0000000000E+00 | 0.0000000000E+00 |
| 0 | 10 | 1.5448025739E−21 | 1.9439299844E−23 | 8.2400402372E−26 |

The head-up display devices of Reference examples 1 and 2 and Examples 1 to 6 have substantially the same configuration in terms of FOV, an eye box (incident pupil) size, a virtual image distance, and an image display region as shown in the data regarding the specifications. However, since the head-up display device of Reference example 1 does not comprise a double reflection mirror that reflects display light twice on the optical path of the display light, a reduction in the size of the optical system and the ensuring of the length of an optical path cannot be compatible with each other in the head-up display device of Reference example 1 in comparison with the head-up display devices of Examples 1 to 6.

Further, since the head-up display device of Reference example 2 further includes one plane mirror in comparison with the head-up display device of Reference example 1, the head-up display device of Reference example 2 can be made to be smaller than the head-up display device of Reference example 1. However, since the head-up display device of Reference example 2 does not comprise a double reflection mirror that reflects display light twice on the optical path of display light, the degree of freedom in the arrangement of the optical systems is low and a large space required to receive the optical path is needed in the head-up display device of Reference example 2. For this reason, a reduction in the size of the optical system and the ensuring of the length of an optical path also cannot be compatible with each other in the head-up display device of Reference example 2 in comparison with the head-up display devices of Examples 1 to 6.

From the above-mentioned data, it is understood that each of all the head-up display devices of Examples 1 to 6 is a head-up display device which has a small size and of which the aberration is small and the range of an eye box in a vertical direction is wide. Further, since the head-up display device comprises a double reflection mirror that reflects display light twice on the optical path of the display light, the head-up display device can be made to have the degree of freedom in the arrangement of the optical systems. Accordingly, the optical systems can be arranged with high degree of freedom according to the specifications in the form of an aspect (horizontally-long arrangement) where the length of the head-up display device in the vertical direction in the drawing is made short, an aspect (vertically-long arrangement) where the length of the head-up display device in the horizontal direction in the drawing is made short, or the like as in the head-up display devices of Examples 1 to 6 shown in FIGS. 5 to 10.

The invention has been described above using the embodiment and the examples, but the invention is not limited to the embodiment and the examples and may have various modifications. For example, the positions and sizes of the respective elements of the head-up display device are not limited to values described in the respective numerical examples, and may be set to other values.

EXPLANATION OF REFERENCES

1: image display surface
2: plane mirror
3: concave mirror
4: plane mirror
6: concave mirror
7: windshield (image-reflecting surface)
8: eye box
9: virtual image
10: head-up display device
11: image display surface
12: plane mirror
13: concave mirror
14: plane mirror
15: concave mirror
16: windshield
17: eye box
21: image display surface
22: plane mirror
23: concave mirror
24: plane mirror
25: concave mirror
26: windshield
27: eye box
31: image display surface
32: plane mirror
33: concave mirror
34: plane mirror
35: concave mirror
36: windshield
37: eye box
41: image display surface
42: plane mirror
43: concave mirror
44: plane mirror
45: plane mirror
46: concave mirror
47: windshield
48: eye box
51: image display surface
52: plane mirror
53: concave mirror
54: plane mirror
55: plane mirror
56: concave mirror
57: windshield
58: eye box
61: image display surface
62: plane mirror
63: concave mirror
64: plane mirror
65: concave mirror
66: windshield
67: eye box
71: image display surface
72: concave mirror
73: concave mirror
74: windshield
75: eye box
81: image display surface
82: concave mirror
83: plane mirror
84: concave mirror
85: windshield
86: eye box

What is claimed is:

1. A head-up display device that reflects display light of an image, which is displayed on an image display surface, toward an observer side by an image-reflecting surface facing the observer to enlarge and display the image to the observer as a virtual image beyond the image-reflecting surface, comprising:
   a first optical system that includes at least one concave mirror, and a second optical system that includes at least one concave mirror, arranged along an optical path of the display light in order from the image display surface side, wherein an intermediate image is formed between the first and second optical systems on the optical path, and the first optical system includes a double reflection mirror that reflects the display light twice on the optical path.

2. The head-up display device according to claim 1, further comprising:

a stop that is positioned closer to the image display surface side than the second optical system on the optical path.

3. The head-up display device according to claim 1, wherein the first optical system includes only one concave mirror.

4. The head-up display device according to claim 2, wherein the first optical system includes only one concave mirror.

5. The head-up display device according to claim 1, wherein the first optical system includes the double reflection mirror of planar shape and a concave mirror arranged on the optical path in order from a side closest to the image display surface side, and the display light emitted from the image display surface is reflected by the double reflection mirror, the concave mirror, and the double reflection mirror in order.

6. The head-up display device according to claim 2, wherein the first optical system includes the double reflection mirror of planar shape and a concave mirror arranged on the optical path in order from a side closest to the image display surface side, and the display light emitted from the image display surface is reflected by the double reflection mirror, the concave mirror, and the double reflection mirror in order.

7. The head-up display device according to claim 3, wherein the first optical system includes the double reflection mirror of planar shape and a concave mirror arranged on the optical path in order from a side closest to the image display surface side, and the display light emitted from the image display surface is reflected by the double reflection mirror, the concave mirror, and the double reflection mirror in order.

8. The head-up display device according to claim 4, wherein the first optical system includes the double reflection mirror of planar shape and a concave mirror arranged on the optical path in order from a side closest to the image display surface side, and the display light emitted from the image display surface is reflected by the double reflection mirror, the concave mirror, and the double reflection mirror in order.

9. The head-up display device according to claim 1, wherein the second optical system consists of one concave mirror.

10. The head-up display device according to claim 2, wherein the second optical system consists of one concave mirror.

11. The head-up display device according to claim 3, wherein the second optical system consists of one concave mirror.

12. The head-up display device according to claim 4, wherein the second optical system consists of one concave mirror.

13. The head-up display device according to claim 5, wherein the second optical system consists of one concave mirror.

14. The head-up display device according to claim 6, wherein the second optical system consists of one concave mirror.

15. The head-up display device according to claim 7, wherein the second optical system consists of one concave mirror.

16. The head-up display device according to claim 8, wherein the second optical system consists of one concave mirror.

17. The head-up display device according to claim 1, wherein the second optical system consists of one concave mirror and one plane mirror.

18. The head-up display device according to claim 2, wherein the second optical system consists of one concave mirror and one plane mirror.

19. The head-up display device according to claim 3, wherein the second optical system consists of one concave mirror and one plane mirror.

20. The head-up display device according to claim 4, wherein the second optical system consists of one concave mirror and one plane mirror.

\* \* \* \* \*